United States Patent
Yamamoto et al.

(10) Patent No.: US 8,382,865 B2
(45) Date of Patent: Feb. 26, 2013

(54) REACTION APPARATUS, FUEL CELL SYSTEM AND ELECTRONIC DEVICE

(75) Inventors: Tadao Yamamoto, Hamura (JP); Kaoru Saito, Hamura (JP); Naotomo Miyamoto, Hamura (JP); Masaharu Shioya, Hamura (JP); Toshihiro Hashimoto, Kirishima (JP); Masaaki Miyahara, Kirishima (JP); Atsushi Ogasawara, Kirishima (JP); Ryuji Mori, Kirishima (JP)

(73) Assignees: Kyocera Corporation, Kyoto (JP); Casio Computer Co., Ltd., Tokyo (JP)

( * ) Notice: Subject to any disclaimer, the term of this patent is extended or adjusted under 35 U.S.C. 154(b) by 747 days.

(21) Appl. No.: 12/439,655

(22) PCT Filed: Aug. 29, 2007

(86) PCT No.: PCT/JP2007/066802
§ 371 (c)(1),
(2), (4) Date: Nov. 12, 2009

(87) PCT Pub. No.: WO2008/026655
PCT Pub. Date: Mar. 6, 2008

(65) Prior Publication Data
US 2010/0112394 A1    May 6, 2010

(30) Foreign Application Priority Data

Aug. 30, 2006 (JP) ................. 2006-234642
Aug. 30, 2006 (JP) ................. 2006-234643
Aug. 30, 2006 (JP) ................. 2006-234645

(51) Int. Cl.
*B01J 7/00* (2006.01)
*C01B 6/24* (2006.01)
*C01B 3/02* (2006.01)
*B01J 10/00* (2006.01)
*B01J 8/00* (2006.01)

(52) U.S. Cl. ............ 48/61; 422/129; 422/625; 422/629; 423/644; 423/648.1

(58) Field of Classification Search .............. 48/61; 422/625–629; 423/644
See application file for complete search history.

(56) References Cited

U.S. PATENT DOCUMENTS 6,159,434 A    12/2000  Gonjo et al.
6,326,097 B1 *  12/2001  Hockaday .............. 429/417
(Continued)

FOREIGN PATENT DOCUMENTS

JP    10236802 A     9/1998
JP    2001180912 A   7/2001
(Continued)

OTHER PUBLICATIONS

Supplementary European search report dated Oct. 6, 2011 for corresponding European application 07806279.1.
(Continued)

*Primary Examiner* — Matthew Merkling
(74) *Attorney, Agent, or Firm* — DLA Piper LLP (US)

(57) ABSTRACT

The invention relates to a reaction apparatus having an enhanced connection, and a fuel cell system and an electronic device that include such a reaction apparatus. A reaction apparatus (1) a reformer (4) in which a reforming reaction chamber (31) is formed, a CO remover in which a removing reaction chamber (35) where a chemical reaction is performed at a temperature lower than that in the reforming reaction chamber (31) is formed, and a connecting portion (6) having a communicating path that communicates between the reforming reaction chamber (31) and the removing reaction chamber (35). The reformer (4) and the CO remover (5) are arranged spaced apart from each other, at least one of which (4, 5) is configured by combining ceramic parts (11, 12) and metal components (15, 16), and the ceramic parts (11, 12) and the metal components (15, 16) are connected with connecting members (18, 20) interposed therebetween. The connecting members (18, 20) have thermal conductivities higher than those of the ceramic parts (11, 12).

15 Claims, 13 Drawing Sheets

U.S. PATENT DOCUMENTS

| | | |
|---|---|---|
| 6,569,553 B1 | 5/2003 | Koripella et al. |
| 2002/0106540 A1 | 8/2002 | Shioya |
| 2003/0003033 A1 | 1/2003 | Taguchi et al. |
| 2004/0025784 A1 | 2/2004 | Kawamura et al. |
| 2004/0148859 A1 | 8/2004 | Kawamura et al. |
| 2004/0241061 A1 | 12/2004 | Takai et al. |
| 2004/0244290 A1 | 12/2004 | Yamamoto et al. |
| 2005/0178063 A1 | 8/2005 | Reinke et al. |
| 2006/0051262 A1 | 3/2006 | Park et al. |
| 2007/0186471 A1 | 8/2007 | Kurashima et al. |
| 2009/0229181 A1 | 9/2009 | Basho et al. |

FOREIGN PATENT DOCUMENTS

| | | |
|---|---|---|
| JP | 2001223261 A | 8/2001 |
| JP | 2001253703 A | 9/2001 |
| JP | 2002053303 A | 2/2002 |
| JP | 2003073105 A | 3/2003 |
| JP | 2003238112 A | 8/2003 |
| JP | 2003300703 A | 10/2003 |
| JP | 2003301295 A | 10/2003 |
| JP | 2003336085 A | 11/2003 |
| JP | 2004089748 A | 3/2004 |
| JP | 2004508670 A | 3/2004 |
| JP | 2004141794 A | 5/2004 |
| JP | 2004303695 A | 10/2004 |
| JP | 2004356003 A | 12/2004 |
| JP | 2005030243 A | 2/2005 |
| JP | 2005087803 A | 4/2005 |
| JP | 2005089206 A | 4/2005 |
| JP | 2005166283 A | 6/2005 |
| JP | 2005200266 A | 7/2005 |
| JP | 2005243330 A | 9/2005 |
| JP | 2005298260 A | 10/2005 |
| JP | 2005314207 A | 11/2005 |
| JP | 2006061819 A | 3/2006 |
| JP | 2006076879 A | 3/2006 |
| JP | 2007069149 A | 3/2007 |
| JP | 2007070178 A | 3/2007 |
| WO | 03073527 A2 | 9/2003 |
| WO | 2004031928 A1 | 4/2004 |
| WO | 2006046426 A1 | 5/2006 |
| WO | 2006046646 A1 | 5/2006 |
| WO | 2007029872 A2 | 3/2007 |

OTHER PUBLICATIONS

International Search Report for corresponding PCT application PCT/JP2007/066802.

Japanese language office action dated Sep. 6, 2011 and its English language translation for corresponding Japanese application 2006234642.

Japanese language office action dated Sep. 6, 2011 and its English language translation for corresponding Japanese application 2006234645.

Supplementary European search report dated Sep. 26, 2011 for corresponding European application 07806278.3.

Japanese language office action dated Apr. 17, 2012 and its English translation issued in corresponding Japanese application 2006234643.

* cited by examiner

REACTION APPARATUS, FUEL CELL SYSTEM AND ELECTRONIC DEVICE

TECHNICAL FIELD

The present invention relates to a reaction apparatus, a fuel cell system comprising such a reaction apparatus, and an electronic device comprising such a fuel cell system.

BACKGROUND ART

Fuel cells, which generate electric energy through an electrochemical reaction between oxygen and hydrogen, are used in automobiles and portable devices as a clean power source having a high energy conversion efficiency. Because hydrogen is difficult to handle, in a certain type of fuel cell, stored hydrogen is not supplied thereto, but instead, an alcohol or hydrocarbon stored is reacted so that a gas composed mainly of hydrogen is generated, and the generated gas is supplied to the fuel cell. A reaction apparatus is used to generate the gas composed mainly of hydrogen.

A conventional reaction apparatus is disclosed in, for example, Japanese Unexamined Patent Publication JP-A 2004-356003. The reaction apparatus disclosed in JP-A 2004-356003 includes a reforming portion that reforms a material that can produce hydrogen through the decomposition of methanol or the like. In the reforming portion, combustion heat generated by a combustion portion through combustion of fuel is propagated from a heat exchanging portion, such as a metal plate of metal foil, and heats a catalyst provided on one surface of a reaction flow channel. The combustion portion includes a heater that conducts current and heats fuel to combust fuel upon start up.

Another conventional reaction apparatus is disclosed in, for example, Japanese Unexamined Patent Publication JP-A 2005-166283. The reaction apparatus disclosed in JP-A 2005-166283 includes a reformer that can produce hydrogen by reforming an organic compound. The reformer supplies a reformed gas containing reformed hydrogen and carbon monoxide to a CO converter and a CO remover that can cause a reaction at a lower temperature.

In the reaction apparatus disclosed in JP-A 2004-356003, it is shown that the heat exchanging portion is made by forming a metal film onto a substrate by vapor deposition or bonding a metal plane (metal foil) to a substrate. In this manner, when attaching the metal film onto the substrate directly, a difference in coefficient of thermal expansion between the substrate and the metal film is significantly large, so that stress is caused in an interface thereof. As a result, there arises a problem that the metal film and the substrate tend to separate from each other or make a gap therebetween.

Furthermore, in the reaction apparatus disclosed in JP-A 2005-166283, the reformer portion and the CO remover (or CO converter) have different reaction temperatures, and, therefore, it is preferable to suppress thermal conduction between the reformer and the CO remover as much as possible. However, when configuring a reformer, a CO remover, and a connecting pipe for connecting the reformer and the CO remover using a material having low thermal conductivity, a problem arises that the reactors cannot be heated quickly to a uniform temperature. On the other hand, the present inventors have developed a finding that forming a reformer and a carbon monoxide remover using a metal having good thermal conductivity is effective in rapidly heating the reformer and the carbon monoxide remover. In this case, both reactors can be heated rapidly, and the whole of the respective reactors can be heated to a uniform temperature. However, the appropriate reaction temperature of the carbon monoxide remover is usually lower than that of the reformer, so that heat is excessively propagated from the reformer to the carbon monoxide remover and cooling the reformer, or excessively heating the carbon monoxide remover. Accordingly, it is not at all easy to appropriately control reaction temperatures particularly for a small-scale reformer and carbon monoxide remover.

DISCLOSURE OF INVENTION

It is an object of the invention to provide a reaction apparatus having an enhanced connection, and a fuel cell system and an electronic device that comprise such a reaction apparatus.

It is still another object of the invention to provide a reaction apparatus comprising a plurality of reaction portions having different appropriate reaction temperatures and capable of controlling each reaction portion so as to have an efficient and appropriate temperature, and a fuel cell system and an electronic device that comprise such a reaction apparatus.

It is still another object of the invention to provide a reaction apparatus capable of suppressing heat transfer between a high temperature reaction portion and a low temperature reaction portion, and a fuel cell system and an electronic device that comprise such a reaction apparatus.

The invention provides a reaction apparatus comprising a reaction portion including a first ceramic part and a first member having a thermal conductivity higher than the first ceramic part;

wherein the first ceramic part and the first member are connected by a connecting member.

It is preferable that a coefficient of thermal expansion of the connecting member is between a coefficient of thermal expansion of the first member having a thermal conductivity higher than the first ceramic part and a coefficient of thermal expansion of the first ceramic part.

The reaction portion may include a high temperature reaction portion in which a high temperature reaction chamber is formed, and a low temperature reaction portion in which a low temperature reaction chamber is formed, and a chemical reaction in the low temperature reaction chamber may be carried at lower temperature than that in the high temperature reaction chamber.

In the case, a connecting portion may be provided between the high temperature reaction portion and the low temperature reaction portion, and it is preferable that the connecting portion is disposed in the first ceramic part.

It is preferable that a communicating path communicating between the high temperature reaction chamber and the low temperature reaction chamber is formed in the first ceramic part. It is preferable that flow channels are formed in the high temperature reaction chamber and the low temperature reaction chamber, and that at least one of the high temperature reaction chamber and the low temperature reaction chamber has a side wall that defines the flow channel and includes a second member having a thermal conductivity higher than the connecting portion.

Further, it is preferable that the ceramic part comprises a laminate of a plurality of ceramic layers.

It is preferable that the reaction apparatus further comprises a heat generating portion that heats at least one of the high temperature reaction portion and the low temperature reaction portion, and that the heat generating portion has a combination of a partition and a substrate that is disposed so as to face the partition and has a thermal conductivity lower than the partition, and the partition is provided to the one of the high temperature reaction portion and the low temperature reaction portion.

It is preferable that the side wall that is disposed in at least one of the high temperature reaction chamber and the low temperature reaction chamber and defines the flow channel has a plurality of fins.

It is preferable that at least one of the high temperature reaction portion and the low temperature reaction portion has a peripheral region connected to the connecting portion and a center region, and the thickness of the peripheral region is smaller than the thickness of the center region.

It is preferable that at least one of the high temperature reaction portion and the low temperature reaction portion has a second ceramic part including a peripheral region connected to the connecting portion and a center region, and a cross-sectional area of the peripheral region in the thickness direction of the second ceramic part is smaller than a cross-sectional area of the center region in the thickness direction of the second ceramic part.

It is preferable that the high temperature reaction portion and the low temperature reaction portion are formed on a continuous ceramic substrate, and a distance between the high temperature reaction portion and the low temperature reaction portion in a peripheral region of the connecting portion is longer than a distance between the high temperature reaction portion and the low temperature reaction portion in a region other than the peripheral region of the connecting portion.

It is preferable that the connecting portion has an incurved region connected to at least one of the high temperature reaction portion and the low temperature reaction portion.

Further, the high temperature reaction portion may perform a reaction that produces hydrogen.

Furthermore, the low temperature reaction portion may perform a reaction that removes carbon monoxide.

The invention further provides a fuel cell system comprising:

the above-described reaction apparatus; and a fuel cell for generating power using a reaction product produced by the reaction apparatus as fuel.

The invention further provides an electronic device comprising the above described fuel cell system.

The invention further provides an electronic device comprising:

an operating portion and a display portion disposed in a case;

an operation control portion for controlling display content of the display portion baaed on input information from the operating portion; and the above-described fuel cell system housed within the case, for supplying power to the operating portion, the display portion and the operation control portion.

According to the invention, the first ceramic part and the first member having a thermal conductivity higher than that of the first ceramic part are connected by the connecting member, so that the connection therebetween can be enhanced.

According to the invention, because the thermal conductivity of the connecting portion is lower than that of the side wall of at least one of the high temperature reaction chamber and the low temperature reaction chamber, heat propagation between the high temperature reaction chamber and the low temperature reaction chamber can be suppressed to a relatively low level. In addition, at least one of the high temperature reaction chamber and the low temperature reaction chamber has the side wall that defines a flow channel and includes a second member having a thermal conductivity higher than the connecting portion, so that the inside of the reaction chamber can be heated to a uniform temperature rapidly.

According to the invention, it is possible to suppress heat transfer between the high temperature reaction portion and the low temperature reaction portion.

According to the invention, the fuel cell can generate power using a reaction product produced by the reaction apparatus as fuel, and, as such, a raw material that is easier to handle than the gaseous fuel supplied to the fuel cell can be caused to react in the reaction apparatus, and the resulting reaction product can be used as fuel in the fuel cell. Therefore, power can be generated in the fuel cell by storing a raw material that is easier to handle than gaseous fuel, and, thus, an easy-to handle fuel cell system can be achieved.

According to the invention, it is possible to achieve an electronic device that is driven with power generated by the fuel cell system.

According to the invention, it is possible to generate and supply the power required by the operating portion, the display portion and the operation control portion with the fuel cell system. Consequently, an electronic device that is driven with power generated by the fuel cell system can be achieved.

BRIEF DESCRIPTION OF DRAWINGS

Other and further objects, features, and advantages of the invention will be more explicit from the following detailed description taken with reference to the drawings wherein.

BEST MODE FOR CARRYING OUT THE INVENTION

Figure 1:
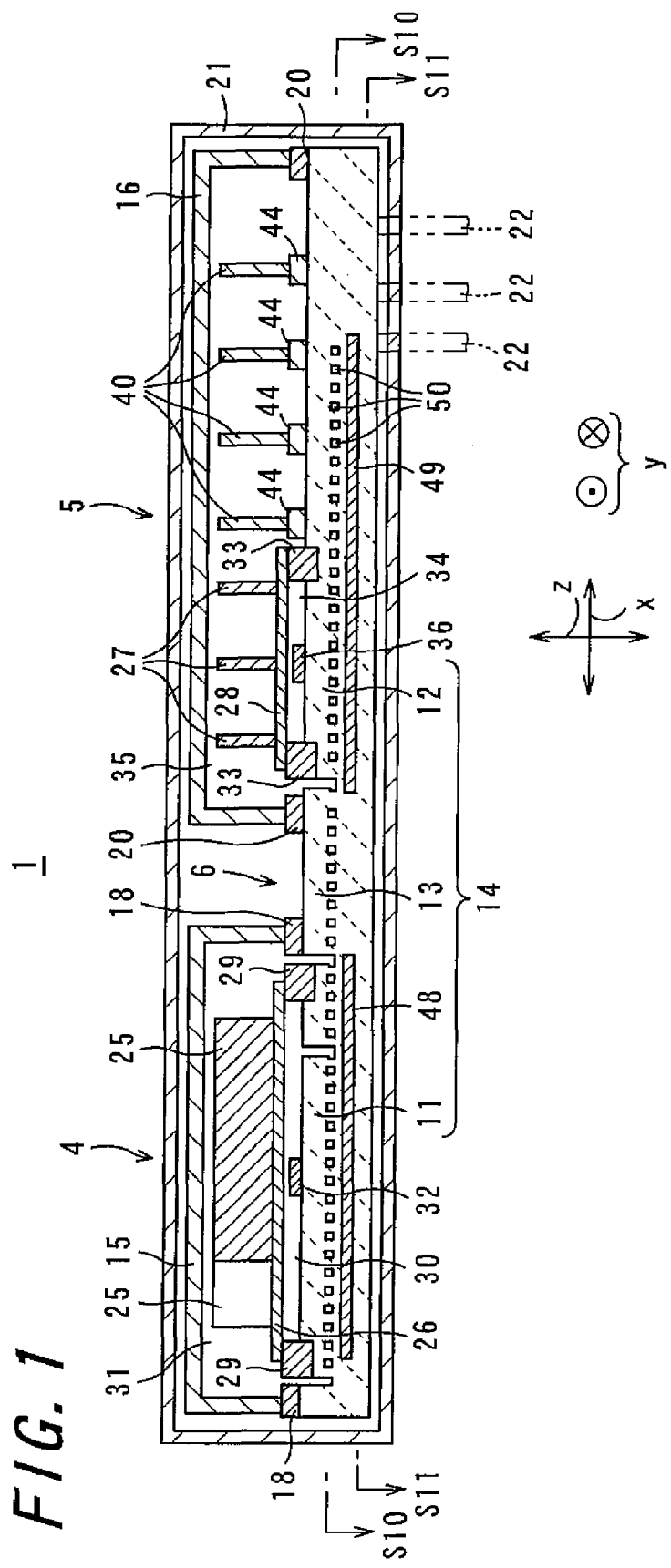
FIG. 1 is a cross-sectional view of a reaction apparatus according to an embodiment of the invention.

Now referring to the drawings, preferred embodiments of the invention are described below.

Figure 2:
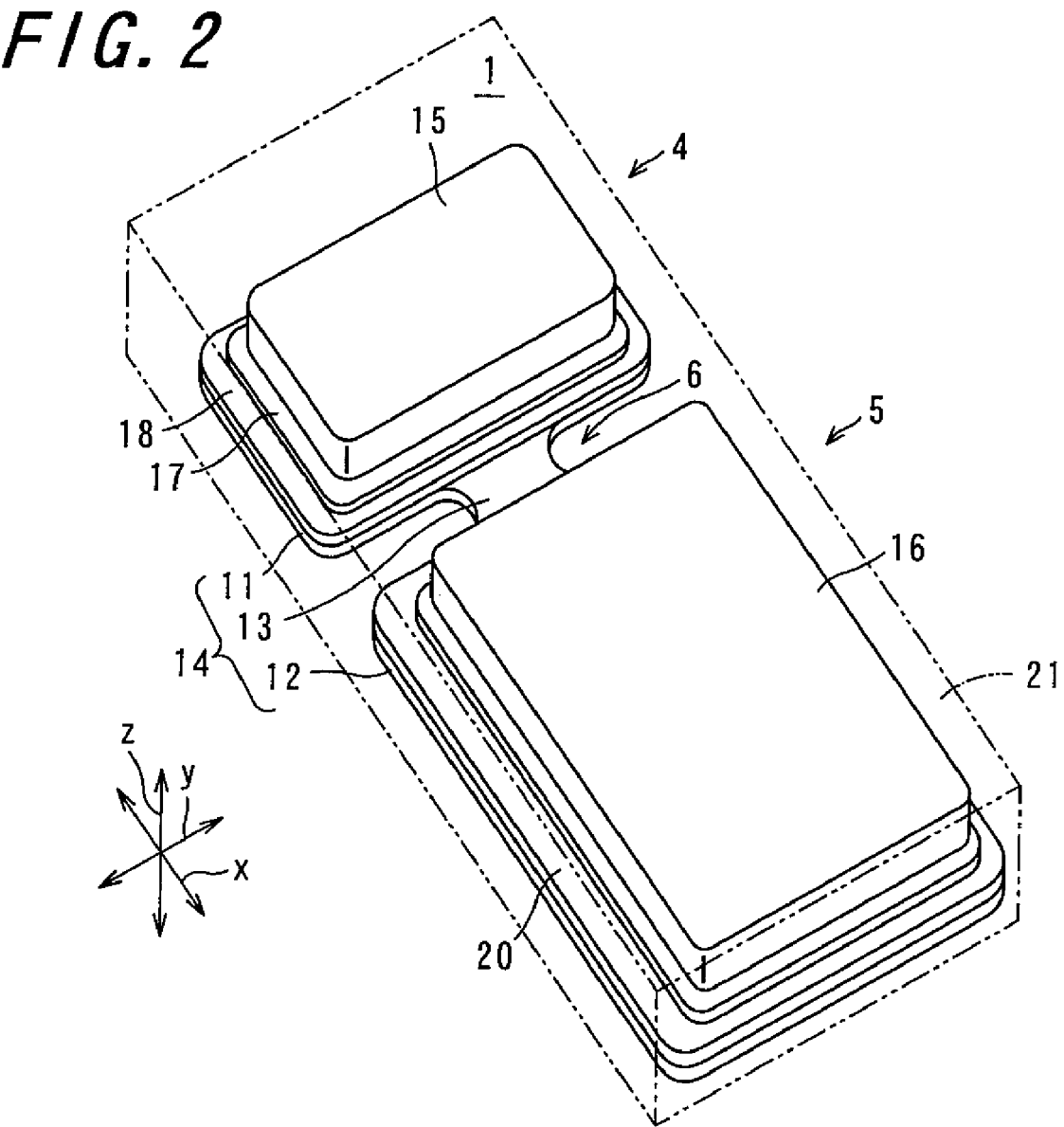
FIG. 2 is a perspective view of the reaction apparatus.
Figure 3:
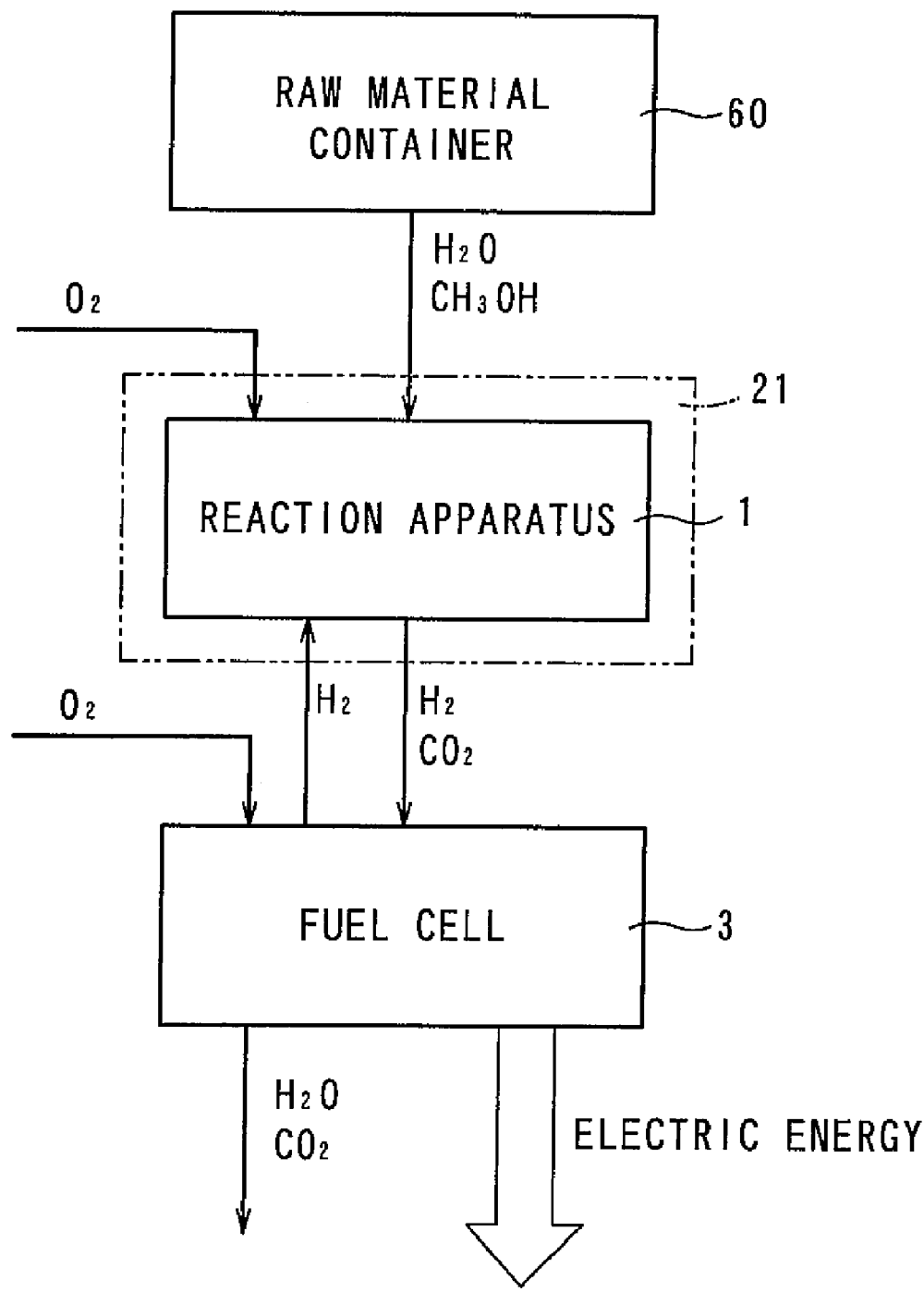
FIG. 3 is a block diagram of a fuel cell system that includes the reaction apparatus.

FIG. 1 is a cross-sectional view of a reaction apparatus 1 according to an embodiment of the invention. FIG. 2 is a perspective view of the reaction apparatus 1. FIG. 3 is a block diagram of a fuel cell system 2 that includes the reaction apparatus 1. The reaction apparatus 1 is an apparatus for generating a reaction product by the chemical reaction of a raw material. In the present embodiment, the reaction apparatus 1 is included in the fuel cell system 2, and is used as a reforming apparatus for generating a fuel utilized by a fuel cell 3 for power generation.

The reaction apparatus 1 includes a reformer 4 serving as a high temperature reaction portion that generates hydrogen gas by reforming a fuel having a compound containing hydrogen in its composition, a carbon monoxide remover (hereinafter referred to as "CO remover") 5 serving as a low temperature reaction portion that selectively oxidizes carbon monoxide in a temperature range lower than that of the high temperature reaction portion, and a connecting portion 6. The reformer 4 and the CO remover 5 are arranged spaced apart from each other, and are connected by the connecting portion 6. Accordingly, in the reaction apparatus 1, the reformer 4, the connecting portion 6 and the CO remover 5 are arranged side by side in this order in a first direction x. The reformer 4, the CO remover 5 and the connecting portion 6 are housed in a heat insulating package 21 made of an insulating material, such as ceramic, or a metal. The space formed by the heat insulating package 21, the reformer 4, the CO remover 5, and the connecting portion has a pressure lower than the atmospheric pressure, preferably, a pressure of less than 1 Pa.

At least one of the reformer 4 and the CO remover 5 (both in the present embodiment) is configured by combining a ceramic part 11, 12 made of ceramic with a metal material that is a metal part, for example, a stainless steel lid member 15, 16. Examples of ceramic include such as alumina ceramic composed mainly of alumina ($Al_2O_3$) (thermal conductivity: 16 W/(m·K), coefficient of thermal expansion: $7 \times 10^{-6}$/° C.), and glass ceramic composed mainly of $Al_2O_3$ and glass (thermal conductivity: 2 W/(m·K), coefficient or thermal expansion: $5.5 \times 10^{-6}$/° C.). The metal material for the lid member 15, 16 can be stainless steel, for example, SUS304 having a thermal conductivity of 16.3 W/(m·K) and a coefficient of thermal expansion from room temperature to 100° C. of $17.3 \times 10^{-6}$/° C. The connecting portion 6 is configured to include a ceramic part 13 made of ceramic. In the present embodiment, the connecting portion 6 is configured only with the ceramic part 13. As used herein, "coefficient of thermal expansion" refers to linear coefficient of expansion, and, unless otherwise stated, an average coefficient of thermal expansion in a temperature range ranging from 0 to 1000° C.

Figure 4:
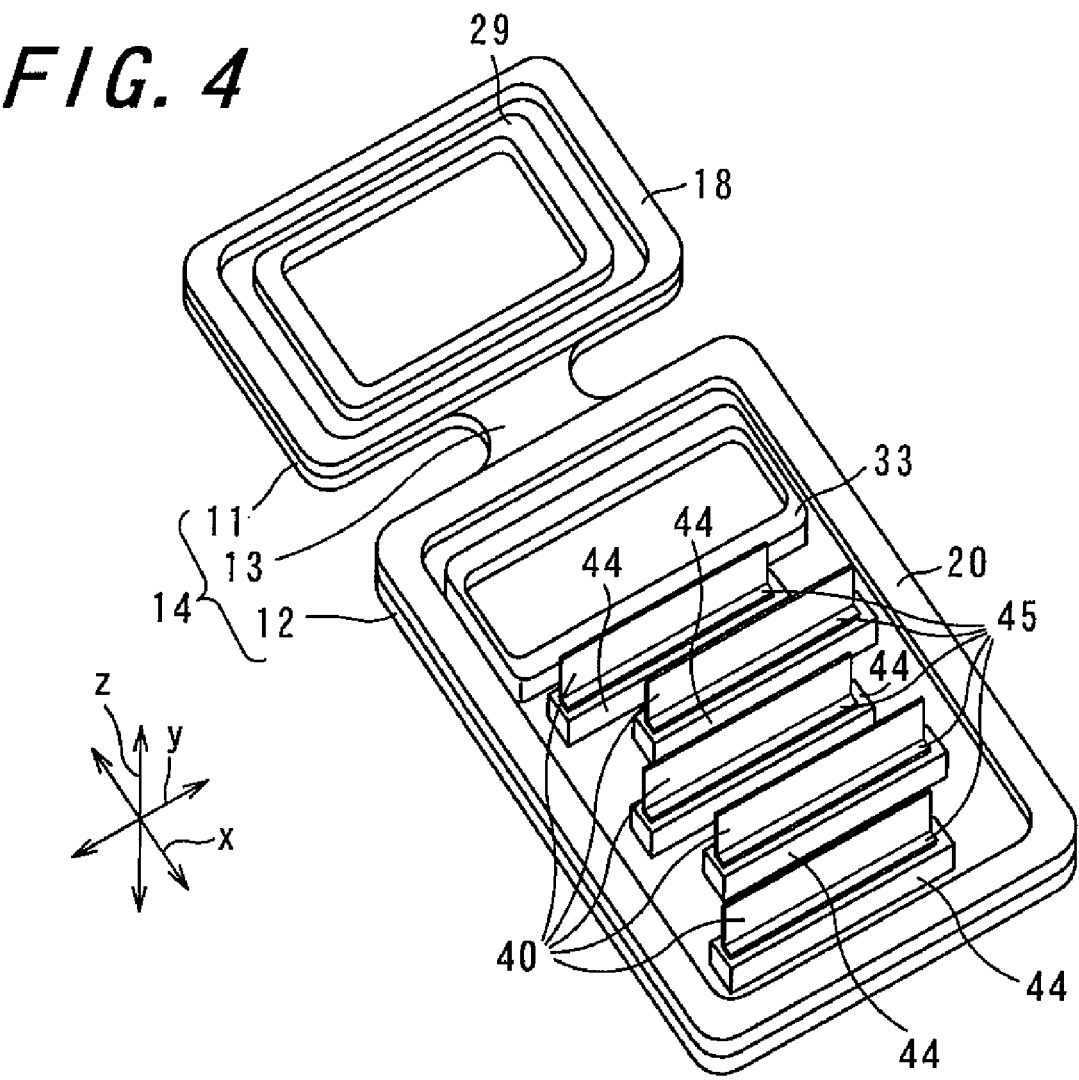
FIG. 4 is a perspective view of a ceramic substrate, in which a reformer connecting member, a remover connecting member and the like are disposed.

FIG. 4 is a perspective view of a ceramic substrate 14, in which a reformer connecting member 18, a remover connecting member 20 and the like are disposed. Referring to FIGS. 1 and 2, the ceramic part 11 constituting the reformer 4 (hereinafter referred to as "reformer ceramic part 11"), the ceramic part 12 constituting the CO remover 5 (hereinafter referred to as "remover ceramic part 12") and the ceramic part 13 constituting the connecting portion 6 (hereinafter referred to as "connecting portion ceramic part 13") are arranged along the same plane, thereby forming a single-piece structured ceramic substrate 14. That is, the ceramic substrate 14 is formed by laminating a plurality of continuous ceramic layers, each extending along the reformer ceramic part 11, the remover ceramic part 12 and the connecting portion ceramic part 13, in a third direction 3, on a plane that is parallel to the first direction x and a second direction y perpendicular to the first direction x.

The reformer ceramic part 11 has a rectangular plate-like shape whose longitudinal sides are parallel to the second direction y. The remover ceramic part 12 has a rectangular plate-like shape whose longitudinal sides are parallel to the first direction x. In the ceramic substrate 14, the first direction x is the longitudinal direction, and the second direction y is the width direction. The length in the second direction y of the reformer ceramic part 11 and that of the remover ceramic part 12 are the same. The length in the second direction y of the connecting portion ceramic part 13 is smaller than the length in the second direction y of the reformer ceramic part 11 and the remover ceramic part 12. Accordingly, the ceramic substrate 14 has a narrow portion constituting the connecting portion ceramic part 13 between a wide portion constituting the reformer ceramic part 11 and a wide portion constituting the remover ceramic part 12, as viewed in the third direction z that is the thickness direction. The third direction z is orthogonal to the plane defined by the first direction x and the second direction y.

The connecting portion ceramic part 13 whose length in the second direction y is small as described above can be configured to connect end portions in the second direction y of the reformer ceramic part 11 and the remover ceramic part 12, but in the present embodiment, the connecting portion ceramic part 13 is configured to connect center portions in the second direction y of the reformer ceramic part 11 and the remover ceramic part 12. The connecting portion ceramic part 13 that is a narrow portion of the ceramic substrate 14 is formed such that the outer surface of at least a portion connected to the reformer ceramic part 11 or the remover ceramic part 12, which are wide portions of the ceramic substrate 14, is incurved and is seamlessly connected to the outer surface of the reformer ceramic part 11 or the remover ceramic part 12, which are wide portions. In the present embodiment, the connecting portion ceramic part 13 is formed such that both side faces in the second direction y are incurved, more specifically, have an arc shape, and are seamlessly connected to the end faces in the first direction x of the reformer ceramic part 11 and the remover ceramic part 12. As described above, the connecting portion ceramic part 13 is formed to have a width in the second direction on y smaller than the width in the second direction y of the reformer ceramic part 11 and the remover ceramic part 12, resulting in a structure in which stress is relatively highly concentrated. However, because the connecting portion ceramic part 13 has a gently curved shape, and the connecting end portions of the connecting portion ceramic part 13 connected to the reformer ceramic part 11 and the remover ceramic part 12 are made wider than the center portion of the connecting portion ceramic part 13, stress can be effectively dispersed, so that stress does not concentrate on the connecting end portions. As a result, damage to the connecting end portions can be suppressed.

Also, the ceramic substrate 14 may be formed such that the reformer ceramic part 11, the remover ceramic part 12 and the connecting portion ceramic part 13 have the same length in the third direction 3, which is the thickness, or have different lengths. Although these regions are shown as having the same length in FIG. 1, in the present embodiment, it is assumed that the connecting portion ceramic part 13, which is a narrow portion, has a length in the third direction z smaller than that of the reformer ceramic part 11 and the remover ceramic part 12, which are wide portions. In the present embodiment, the connecting portion ceramic part 13 is formed as shown in FIG. 2 when viewed in the third direction z. More specifically, the connecting portion ceramic part 13 is formed such that the region 13 has an arc shape, and that an end face that is connected to the reformer ceramic part 11 and another end face that is connected to the remover ceramic part 12 have a length in the second direction y longer than the length in the second direction y of the center portion of the connecting portion ceramic part 13, and that the side faces extending in the first direction x are connected seamlessly.

Figure 5:
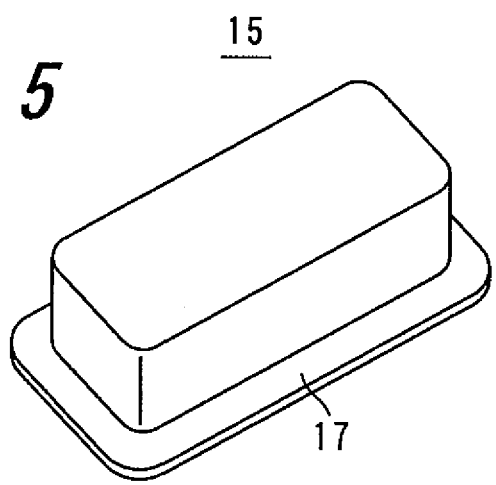
FIG. 5 is a perspective view of a reformer lid member.

FIG. 5 is a perspective view of a reformer lid member 15. Further referring to FIGS. 1, 2 and 4, a lid member (hereinafter referred to as "reformer lid member") 15 constituting the reformer 4 and a lid member (hereinafter referred to as "remover lid member") 16 constituting the CO remover 5 are disposed on one side in the thickness direction of the ceramic substrate 14. The thickness direction of the ceramic substrate 14 is the third direction z. The reformer lid member 15 is connected to the reformer ceramic part 11 to seal the space above the reformer ceramic part 11. The remover lid member 16 is connected to the remover ceramic part 12 to seal the space above the remover ceramic part 12.

The reformer lid member 15 is a substantially rectangular parallelepiped case with one side open, and includes a wall surrounding the perimeter and a top plate that closes one side of the wall. The reformer lid member 15 has, although not illustrated in FIG. 1, but as shown in FIG. 2, an open end portion 17 that has an outward flange formed on the reformer ceramic part 11 side. On the surface portion constituting one side in the thickness direction of the reformer ceramic part 11, an annular connecting member (hereinafter referred to as "reformer connecting member") 18 surrounding the perimeter of the reformer ceramic part 11 is provided. The reformer lid member 15 has a structure in which the open end portion 17 is connected to the reformer ceramic part 11 with the reformer connecting member 18.

Figure 6:
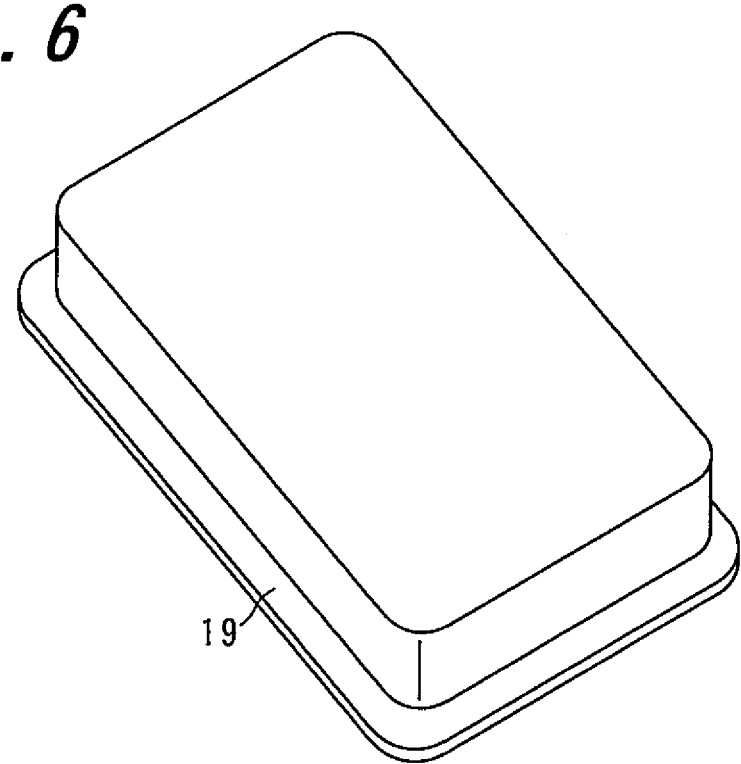
FIG. 6 is a perspective view of the remover lid member.

FIG. 6 is a perspective view of the remover lid member 16. Further referring to FIGS. 1, 2 and 4, the remover lid member 16 is a substantially rectangular parallelepiped case with one side open, and includes a wall surrounding the perimeter and a top plate that closes one side of the wall. The remover lid member 16 has, although not illustrated in FIG. 1, but as shown in FIG. 2, an open end portion 19 that has an outward flange formed on the remover ceramic part 12 side. On the surface portion constituting one side in the thickness direction of the remover ceramic part 12, an annular connecting member (hereinafter referred to as "remover connecting member") 20 surrounding the perimeter of the remover ceramic part 12 is provided. The remover lid member 16 has a structure in which the open end portion 19 is connected to the remover ceramic part 12 with the remover connecting member 20.

The reformer connecting member 18 and the remover connecting member 20 can be made of, for example, an iron-nickel-cobalt (Fe—Ni—Co) alloy (coefficient of thermal expansion: $10 \times 10^{-6}/°C$), iron-nickel (Fe—Ni) alloy (coefficient of thermal expansion: $12 \times 10^{6}/°C$) or the like. The coefficient of thermal expansion (an average coefficient of thermal expansion in a temperature range ranging from 0 to 1000° C.) of the reformer connecting member 18 and the remover connecting member 20 is a value between the coefficient of thermal expansion of the reformer lid member 15 and remover lid member 16 and the coefficient of thermal expansion of the reformer ceramic part 11 and remover ceramic part 12. The reformer connecting member 18 is connected to the reformer ceramic part 11 by brazing or the like. The reformer lid member 15 is connected to the reformer connecting member 18 by welding, such as seam welding, brazing or the like. The remover connecting member 20 is connected to the remover ceramic part 12 by brazing or the like. The remover lid member 16 is connected to the remover connecting member 20 by welding, such as seam welding, brazing or the like. In this manner, the reformer lid member 15 and the remover lid member 16 are connected to the reformer ceramic part 11 and the remover ceramic part 12, respectively, and, thereby, an internal space is formed in the reformer 4 and the remover 5.

Figure 7:
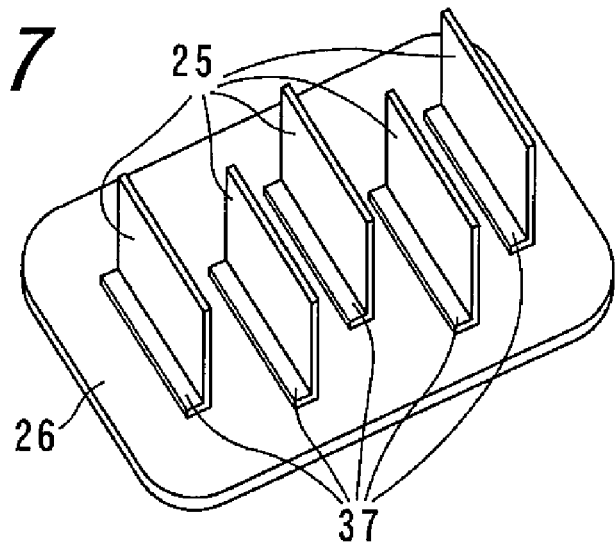
FIG. 7 is a perspective view of a reformer partition, in which reformer fins serving as a heat dissipating member are disposed.
Figure 8:
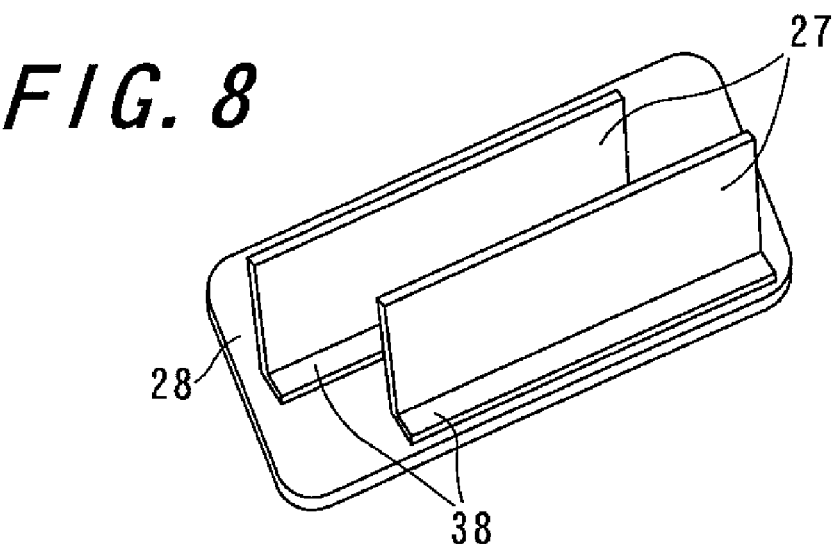
FIG. 8 is a perspective view of a remover partition, in which remover fins serving as a heat dissipating member are disposed.
Figure 9:
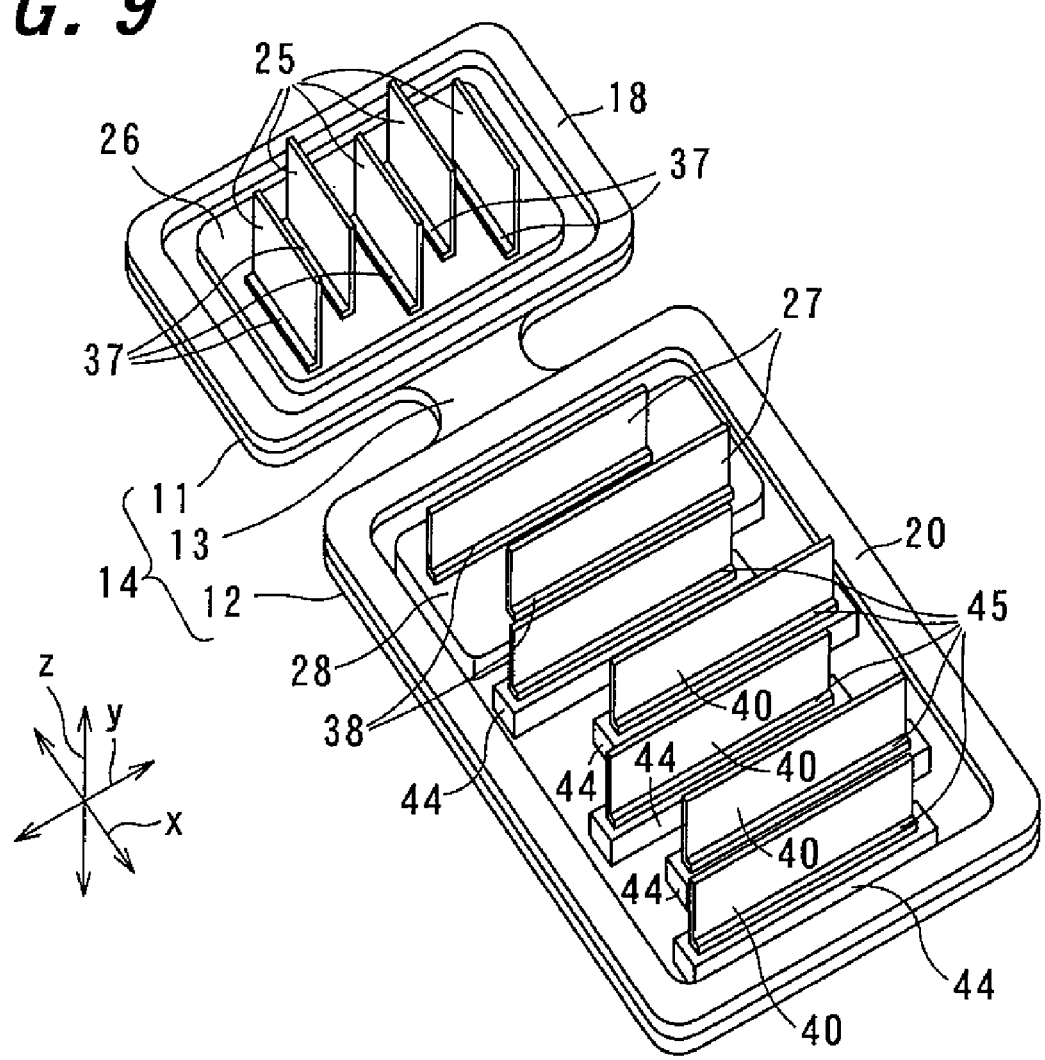
FIG. 9 is a perspective view of the reaction apparatus, from which the reformer lid member and the remover lid member have been removed.

FIG. 7 is a perspective view of a reformer partition 26, in which reformer fins 25 serving as a heat dissipating member are disposed. FIG. 8 is a perspective view of a remover partition 28, in which remover fins 27 serving as a heat dissipating member are provided. FIG. 9 is a perspective view of the reaction apparatus 1, from which the reformer lid member 15 and the remover lid member 16 have been removed. Further referring to FIGS. 1 and 4, at least one of the reformer 4 and the CO remover 5 (both in the present embodiment) includes a partition 26, 28 that divides the internal space. The partition (hereinafter referred to as "reformer partition") 26 provided in the reformer 4 and the partition (hereinafter referred to as "remover partition") 28 provided in the CO remover 5 are substantially rectangular with longitudinal sides parallel to the second direction y.

On the surface portion constituting one side in the thickness direction of the reformer ceramic part 11, a partition holder (hereinafter referred to as "reformer partition holder") 29 is provided inwardly spaced apart from the reformer connecting member 18. The reformer partition holder 29 is an annular member surrounding the perimeter. The reformer partition 26 is disposed parallel to the reformer ceramic part 11, and the periphery of the reformer partition 26 is connected to the reformer ceramic part 11 with the reformer partition holder 29. As a result of providing the reformer partition 26, in the reformer 4, a reformer combustion chamber 30 that is located inwardly relative to the reformer partition holder 29 and serves as a heat generating portion, and a reforming reaction chamber 31 that is located on the outer side relative to the reformer partition holder 29 and serves as a high temperature reaction chamber are formed. The reforming reaction chamber 31 corresponds to a housing unit. The reformer combustion chamber 30 and the reforming reaction chamber 31 are adjacent to each other with the reformer partition 26 interposed therebetween. The reformer combustion chamber 30 is formed inwardly spaced apart from the reformer connecting member 18.

On the surface portion constituting one side in the thickness direction of the remover ceramic part 12, a partition holder (hereinafter referred to as "remover partition holder") 33 is provided inwardly spaced apart from the remover connecting member 20. The remover partition holder 33 is an annular member surrounding the perimeter. The remover partition 28 is disposed parallel to the remover ceramic part 12, and the periphery of the remover partition 28 is connected to the remover ceramic part 12 with the remover partition holder 33. As a result of providing the remover partition 29, in the CO remover 5 are formed a remover combustion chamber 34 that is located inwardly relative to the remover partition holder 33 and serves as a heat generating portion, and a removing reaction chamber 35 that is located on the outer side relative to the remover partition holder 33 and serves as a low temperature reaction chamber. The removing reaction chamber 35 corresponds to a housing unit. The remover combustion chamber 34 and the removing reaction chamber 35 are adjacent to each other with the remover partition 28 interposed therebetween. The remover partition holder 33 is provided in a region of the CO remover 5 that is located closer to the reformer 4. The remover combustion chamber 34 is formed in the region of the CO remover 5 that is located closer to the reformer 4. The remover combustion chamber 34 is formed inwardly spaced apart from the remover connecting member 20.

The reformer partition 26 and the remover partition 28 can be made of the same material as used in the reformer lid member 15 and the remover lid member 16, namely, a metal, such as stainless steel, an iron-nickel cobalt alloy or an iron-nickel alloy. The reformer partition holder 29 and the remover partition holder 33 can be made of the same material as used in the reformer connecting member 18 and the remover connecting member 20, such as an iron-nickel-cobalt (FE—Ni—Co) alloy. The coefficient of thermal expansion (an average coefficient of thermal expansion in a temperature range ranging from 0 to 1000° C.) of the reformer partition holder 29 and the remover partition holder 33 is a value between the coefficient of thermal expansion of the reformer partition 26 and remover partition 28 and the coefficient of thermal expansion of the reformer ceramic part 11 and remover ceramic part 12. The reformer partition holder 29 is connected to the reformer ceramic part 11 by brazing or the like. The reformer partition 26 is connected to the reformer partition holder 29 by welding, such as seam welding, brazing or the like. The remover partition holder 33 is connected to the remover ceramic part 12 by brazing or the like. The remover partition 28 is connected to the remover partition holder 33 by welding, such as seam welding, brazing or the like.

As shown in FIG. 1, a connecting portion connected to the reformer partition holder 29 of the surface portion constituting one side in the thickness direction of the reformer ceramic part 11 is depressed to form a recess. Alternatively, the surface portion constituting one side in the thickness direction of the reformer ceramic part 11 that is located within the reformer partition holder 29 of the reformer ceramic part 11 is elevated to form a projection. Alternatively, the length in the third direction z of the reformer partition holder 29 that is the height thereof is made smaller than the length in the third direction z of the reformer connecting member 18 that is the height thereof. With such a configuration, the thickness direction length, or in other words, the length in the third direction z of the reformer combustion chamber 30 can be made small, which makes it easier for a raw material to come into contact with the inner surface that defines the reformer combustion chamber 30. Accordingly, by depositing a catalyst onto the inner surface that defines the reformer combustion chamber 30, it is possible to allow a raw material to easily make contact with the catalyst and increase reaction efficiency.

Furthermore, although not illustrated in FIG. 4, but as shown in FIG. 1, in the reformer combustion chamber 30, a sectioning member (hereinafter referred to as "reformer sectioning member") 32 is provided on the reformer ceramic part 11. In the remover combustion chamber 34, a sectioning member (hereinafter referred to as "remover sectioning member") 36 is provided on the remover ceramic part 12. The reformer sectioning member 32 is a member extending in the second direction y, and as a result of providing the reformer sectioning member 32, a flow channel that meanders in the second direction y is formed in the reformer combustion chamber 30. The remover sectioning member 36 is a member extending in the second direction y, and as a result of providing the remover sectioning member 36, a flow channel that meanders in the second direction y is formed in the reformer combustion chamber 30. The reformer sectioning member 32 and the remover sectioning member 36 are made of the same material as used in the reformer partition holder 29, such as an iron-nickel-cobalt (Fe—Ni—Co) alloy. The reformer sectioning member 32 is connected to the reformer ceramic part 11 by brazing or the like. The remover sectioning member 36 is connected to the remover ceramic part 12 by brazing or the like.

A catalyst is deposited onto the surface of the reformer partition 26 or the reformer sectioning member 32 in order to facilitate the combustion reaction that needs to take place in the reformer combustion chamber 30. Likewise, a catalyst is deposited onto the surface of the remover partition 28 or the remover sectioning member 36 in order to facilitate the combustion reaction that needs to take place in the remover combustion chamber 31. The catalyst deposited onto the reformer partition 26 or the reformer sectioning member 32 can be, for example, a reforming catalyst $CuZnO/Al_2O_3$, and the catalyst deposited onto the remover partition 28 or the remover sectioning member 36 can be, for example, a removing catalyst $Pt/Al_2O_3$.

Also, as shown in FIG. 1, a connecting portion connected to the remover partition holder 33 of the surface portion constituting one side in the thickness direction of the remover ceramic part 12 is depressed to form a recess. Alternatively, the surface portion constituting one side in the thickness direction of the remover ceramic part 12 that is located within the remover partition holder 33 of the remover ceramic part 12 is elevated to form a projection. Alternatively, the length in the third direction z of the remover partition holder 33 that is the height thereof is made smaller than the length in the third direction z of the remover connecting member 20 that is the height thereof. With such a configuration, the thickness direction length, or in other words, the length in the third direction z of the remover combustion chamber 34 can be made small, which makes it easier for a raw material to come into contact with the inner surface that defines the remover combustion chamber 34. Accordingly, by depositing a catalyst onto the inner surface that defines the remover combustion chamber 34, it is possible to allow a raw material to easily come into contact with the catalyst and increase reaction efficiency.

Furthermore, as shown, in FIG. 1, in the reforming reaction chamber 31, a plurality of fins (hereinafter referred to as "reformer fins") 25 as shown in FIG. 7 are provided between the reformer partition 26 and the top plate of the reformer lid member 15. The reformer fins 25 are each rectangular plate-like fins extending in the first and third directions x and z, and these fins are disposed such that the longitudinal direction matches the first direction x and a spacing is interposed between adjacent fins in the second direction y. The reformer fins 25 are arranged such that the fins are alternately offset in the first direction x. With the reformer fins 25, the inner space of the reforming reaction chamber 31 that is a flow channel formed in the reforming reaction chamber 31 is sectioned, and a flow channel that is adjacent to the reformer combustion chamber 30 with the reformer partition 26 interposed therebetween and that meanders with the width extending in the first direction x is formed in the reforming reaction chamber 31.

Each reformer fin 25 is connected to and erected on the reformer partition 26. In each reformer fin 25, although not illustrated in FIG. 1, but as shown in FIGS. 7 and 9, a reformer partition 26-side and portion 37 is bent perpendicularly to form a hook shape. Each reformer fin 25 is made of an iron nickel cobalt alloy, iron nickel alloy, stainless steel or the like, is spot-welded at the hook-shaped end portion 37, and is erected on the reformer partition 26. The reformer fins 25 are spaced apart from the inner surfaces that define the reforming reaction chamber 31 except for the surface of the reformer partition 26. That is, a slight gap is provided between the upper portion of each reformer fin 25 and the inner surface of the reformer lid member 15. Accordingly, even in the event that the metallic reformer fins 25 expand in the third direction x due to heat when the reformer 4 is heated to, for example, 200° C. to 350° C., the reformer fins 25 will not push up the reformer lid member 15 with stress as a result of thermal expansion. Similarly, even in the event that the reformer lid member 15 becomes bowed to some extent toward the reformer fin 25 side due to thermal expansion, the reformer lid member 15 will not push the reformer fins 25. Therefore, the reformer lid member 15 or the reformer fins 25 can be prevented from being damaged and deformed. It is also possible to prevent the reformer lid member 15 from being removed from the ceramic part 11 and to prevent a gap, which would allow a fluid leak, from being created in the connecting portion connected to the reformer connecting member 18.

A catalyst is deposited onto both sides of each reformer fin 25 so as to facilitate the chemical reaction that needs to take place in the reforming reaction chamber 31. Accordingly, a fluid can efficiently come into contact with the catalyst due to the reformer fins 25 that section the right and left of a flow channel, and, thus, the reaction can be rapidly facilitated. In addition, by providing the same catalyst as used in the reformer fins 25 to the reformer partition 26, the amount of catalyst supported can be further increased, and by providing the same catalyst as used in the reformer fins 25 to the inner surface of the top plate of the reformer lid member 15, the amount of catalyst supported can be increased even further. As described above, the reformer fins 25, the reformer partition 26 and the reformer lid member 15 are all made of the above-described metal parts, and, therefore, these components have superior heat propagation properties, can heat the catalyst rapidly, and can cause a reaction efficiently.

The catalyst deposited onto the reformer fins 25 can be, for example, a copper (Cu)/zinc oxide (ZnO) based catalyst. The Cu/ZnO-based catalyst may be a catalyst in which a Cu component is carried on a ZnO component, or a catalyst in which a Cu component and a ZnO component are carried on an aluminum oxide $Al_2O_3$). Alternatively, a catalyst obtained by incorporating a platinum group element in a Cu/ZnO-based catalyst may be used. Examples of the platinum group element include ruthenium (Ru), rhodium (Rh), palladium (Pd), osmium (Os), iridium (Ir), and platinum (Pt).

As shown in FIG. 1, in the removing reaction chamber 35, a plurality of fins (hereinafter referred to as "remover fins") 27 as shown in FIG. 9 are provided between the remover partition 28 and the top plate of the remover lid member 16 in a region closer to the reformer 4 in which the remover combustion chamber 34 is provided. The remover fins 27 are each rectangular plate-like fins extending in the second and third directions y and z, and these fins are disposed such that the longitudinal direction matches the second direction y and a spacing is interposed between adjacent fins in the first direction x. The remover fins 27 are arranged such that the fins are alternately offset in the second direction y. With the remover fins 27, the inner space of the removing reaction chamber 35 that is a flow channel formed in the removing reaction chamber 35 is sectioned, and a flow channel that is adjacent to the remover combustion chamber 34 with the remover partition 28 interposed therebetween and that meanders with the width extending in the second direction y is formed in the removing reaction chamber 35.

Each remover fin 27 is connected to and erected on the remover partition 28. In each remover fin 27, although not illustrated in FIG. 1, but as shown in FIGS. 8 and 9, a remover partition 28-side end portion 38 is bent perpendicularly to form a hook shape. Each remover fin 27 is made of a material that is the same as that of the reformer fins 25, such as an iron nickel cobalt alloy, iron-nickel alloy or stainless steel, and is spot-welded at the hook-shaped end portion 38, and is erected on the remover partition 28. The remover fins 27 are spaced apart from the inner surfaces that define the removing reaction chamber 35 except for the surface of the remover partition 28. That is, a slight gap is provided between the upper portion of each remover fin 27 and the inner surface of the remover lid member 16. Accordingly, even in the event that the metallic remover fins 27 expand in the third direction z due to heat when the CO remover 5 is heated to, for example, 150° C. to 200° C., the remover fins 27 will not push up the remover lid member 16 with stress as a result of thermal expansion. Similarly, even in the event that the remover lid member 16 becomes bowed to some extent toward the remover fin 27 side due to thermal expansion, the remover lid member 16 will not push the remover fins 27. Therefore, the remover lid member 16 can be prevented from being removed from the remover ceramic part 12, and the remover lid member 16 or the remover fins 27 can be prevented from being damaged and deformed. It is also possible to prevent a gap, which would allow a fluid leak, from being created in the connecting portion connected to the remover connecting member 20 or in the connecting portion connected to the remover partition holder 33.

Furthermore, as shown in FIGS. 1 and 4, in the removing reaction chamber 35, a plurality of auxiliary fins 40 are provided in a region of the CO remover 5 that is located opposite to the reformer 4, or in other words, in a region that is adjacent to the region in which the remover combustion chamber 34 is formed and is opposite to the reformer 4. The auxiliary fins 40 are each rectangular plate fins extending in the second and third directions y and z, and the fins are disposed such that the longitudinal direction matches the second direction y and a spacing is interposed between adjacent fins in the first direction x. The auxiliary fins 40 are arranged such that the fins are alternately offset in the second direction y. With the auxiliary fins 40, the inner space of the removing reaction chamber 35 that is a flow channel formed in the removing reaction chamber 35 is sectioned, and a flow channel that is connected to the flow channel formed by the remover fins 27 and that meanders with the width extending in the second direction y is formed in the removing reaction chamber 35. The flow channel formed by these auxiliary fins 40 is not adjacent to the remover combustion chamber 34.

On the surface portion constituting one side in the thickness direction of the remover ceramic part 12, a plurality of auxiliary fin holders 44 are provided inwardly spaced apart from the remover connecting member 20 and also spaced apart from the remover partition holder 33 in the direction opposite to the reformer 4. The auxiliary fin holders 44 are each substantially rectangular plate-like members extending in the first and second directions x and y, and the holders are disposed such that the longitudinal direction matches the second direction y and a spacing is interposed between adjacent holders in the first direction x. The auxiliary fin holders 44 are arranged such that the holders are alternately offset in the second direction y, as in the case of the auxiliary fins 40. The auxiliary fin holders 44 are made of the same material as used in the reformer connecting member 18, the remover connecting member 20, the reformer partition holder 29 and the remover partition holder 33, such as an iron-nickel cobalt (Fe—Ni—Co) alloy, and are connected to the remover ceramic part 12 by brazing or the like.

Each auxiliary fin 40 is connected to and erected on the auxiliary fin holder 44. In each auxiliary fin 40, although not illustrated in FIG. 1, but as shown in FIGS. 4 and 9, an auxiliary fin holder 44-side end portion 45 is bent perpendicularly to form a hook shape. Each auxiliary fin 40 is made of the same material as used in the reformer fins 25 and the remover fins 27, such as an iron-nickel cobalt alloy, iron-nickel alloy, stainless steel or the like, and is spot-welded at the hook-shaped end portion 45, and is erected on the auxiliary fin holder 44. The auxiliary fins 40 are spaced apart from the inner surfaces that define the removing reaction chamber 35 except for the surface of the auxiliary fin holders 44. Accordingly, the auxiliary fins 40 are located inwardly from the remover lid member 16 with a slight space therebetween. As such, even in the event that the metallic auxiliary fins 40 expand due to heat, in the third direction z when the CO remover 5 is heated to, for example, 150° C. to 200° C., the auxiliary fins 40 will not push up the remover lid member 16 with stress as a result of thermal expansion. Similarly, even in the event that the remover lid member 16 becomes bowed to some extent toward the auxiliary fin 40 side due to thermal expansion, the remover lid member 16 will not push the auxiliary fins 40, so that it is possible to prevent the remover lid member 16 from being removed from the ceramic substrate 14, and to prevent a gap, which would allow a fluid leak, from being created in the connecting portion.

The reformer fins 25, the remover fins 27 and the auxiliary fins 40 have a thermal conductivity of 17 to 24 w/(m·K).

In order to facilitate the chemical reaction that needs to take place in the removing reaction chamber 35, a catalyst is deposited onto both sides of each remover fin 27 and each auxiliary fin 40. Accordingly, a fluid can efficiently come into contact with the catalyst due to the remover fins 27 that section the right and left of a flow channel, and, thus, a reaction can be rapidly facilitated. In addition, by providing the same catalyst as used in the remover fins 27 to the auxiliary fins 40, the reaction can be further rapidly facilitated, and the amount of catalyst supported can be increased. Likewise, by providing the same catalyst as used in the remover fins 27 to the remover partition 28, the amount of catalyst supported can be further increased, and by providing the same catalyst as used in the remover fins 27 to the inner surface of the top plate of the remover lid member 16, the amount of catalyst supported can be increased even more. As described above, the remover fins 27, the remover partition 28 and the remover lid member 16 are all made of the above-described metal parts, and, therefore, these components have superior heat propagating properties, can heat the catalyst rapidly, and can cause a reaction efficiently.

The catalyst deposited onto the remover fins 27 can be, for example, a Pt-based catalyst. By using such a catalyst, CO can be selectively oxidized. The Pt-based catalyst can be a catalyst in which Pt is carried on $Al_2O_3$, or a catalyst in which Pt and a platinum group element other than Pt are carried on $Al_2O_3$. Examples of a platinum group element other than Pt include Ru, Rh, Pd, Os, and Ir.

It is possible to employ a configuration in which only either of the reformer fins 25 and the remover fins 27 is provided, but in this embodiment, both the reformer fins 25 and the remover fins 27 are provided. Further, in the case of a configuration in which the remover fins 27 are not provided, the auxiliary fins 40 may or may not be provided.

As shown in FIG. 1, the reformer ceramic part 11 and the remover ceramic part 12 include a heater 48 and a heater 49, respectively. The heaters 48 and 49 are disposed in a position facing the reformer 4 and the CO remover 5 in the reformer ceramic part 11 and the remover ceramic part 12, respectively. As such, the heaters 48 and 49 can directly heat the reformer 4 and the CO remover 5, respectively. Particularly, even when off gas, which will be described later, does not reach the reformer combustion chamber 30 and the remover combustion chamber 34, the reformer 4 and the CO remover 5 can be heated to temperatures at which the reactions can take place. While the heating temperatures of the reformer 4 and the CO remover 5 can be the same, it is possible to use a built-in single-piece structured heater that extends along the reformer ceramic part 11, the remover ceramic part 12 and the connecting portion ceramic part 13.

The heaters 48 and 49 are both what is called heating resistors that rapidly generate heat when electric power is supplied, and these heaters can supply generated heat to the reforming reaction chamber 31 and the removing reaction chamber 35 so as to heat the reforming reaction chamber 31 and the removing reaction chamber 35 to predetermined temperature, respectively. The heaters 48 and 49 rapidly heat the reforming reaction chamber 31 and the removing reaction chamber 35 to temperatures at which a reforming reaction and carbon monoxide removing reaction can take place, respectively, upon start-up of the fuel cell system 2, or in other words, by application of a voltage before hydrogen is supplied to the fuel cell 3.

Figure 10:
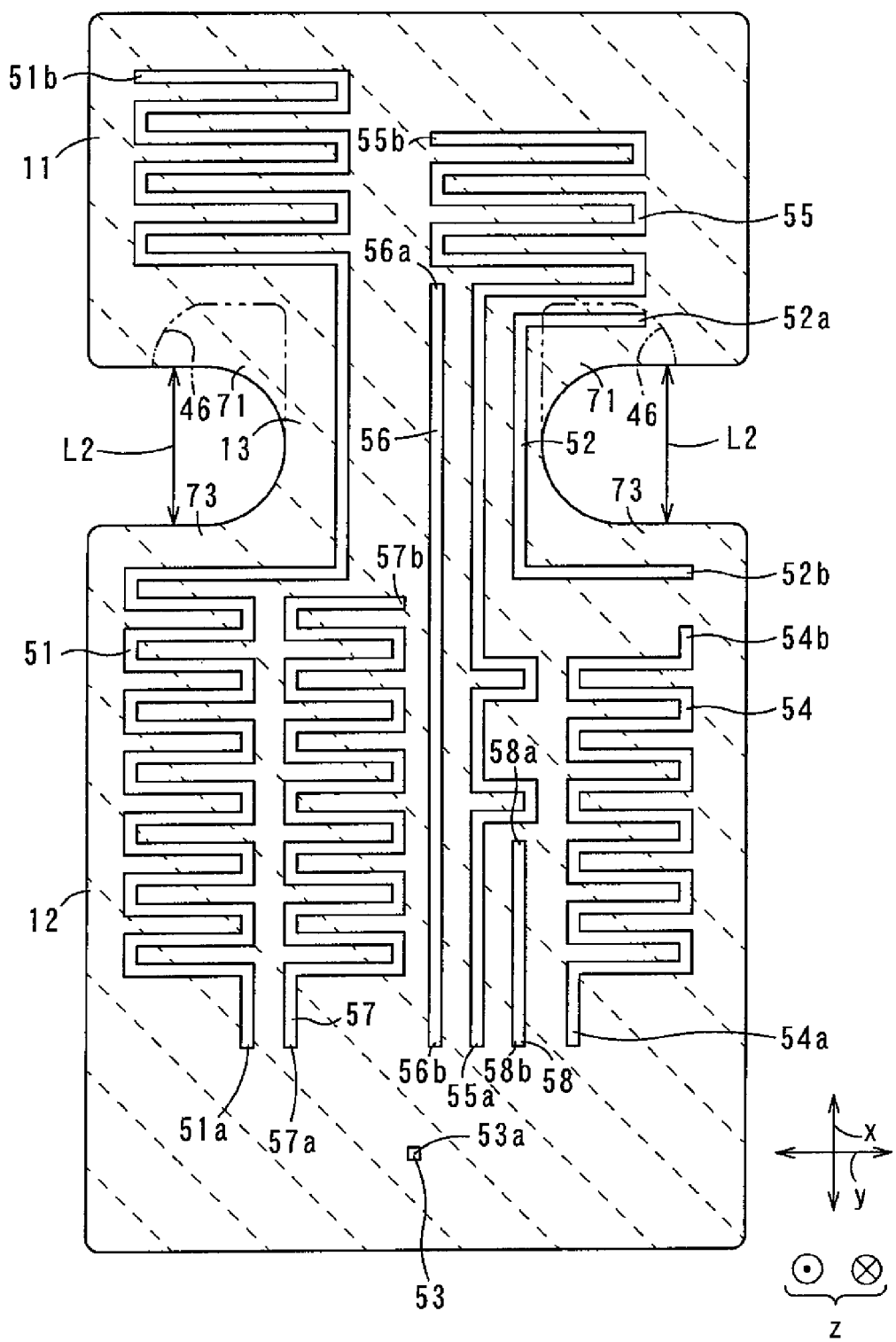
FIG. 10 is a cross-sectional view of the ceramic substrate taken on a line S10-S10 of FIG. 1.

FIG. 10 is a cross sectional view of the ceramic substrate 14 taken on a line S10 S10 of FIG. 1. FIG. 10 shows an example of a flow channel 50 that is formed on the ceramic substrate 14. In the interior of the ceramic substrate 14, a flow channel (hereinafter referred to as "substrate's interior flow channel") 50, through which a fluid that is involved in the chemical reactions in the reformer 4 and the CO remover 5 flows, is formed. This substrate's interior flow channel 50 is a flow channel for pretreating the fluid. The pretreatment involves preheating and vaporization.

The substrate's interior flow channel 50 includes first to eighth flow channels 51 to 58. The first to eighth flow channels 51 to 58 are formed separately so as not to communicate with one another. The first to eighth flow channels 51 to 58 can be planar flow channels that basically include portions extending in the first and second directions x and y along a plane perpendicular to the third direction z as shown in the example of FIG. 10, or can be three-dimensionally configured flow channels that include portions extending in the first to third directions x to z. In the example shown in FIG. 10, the first to eighth flow channels 51 to 58 are formed in a position offset from each other in the first and second directions x and y on the same layer region in the third direction z that is the thickness direction of the ceramic substrate 14, so as not to communicate with one another, but these flow channels may be formed in a position offset from each other in the third direction z so as not to communicate with one another.

The first flow channel 51 is a raw material vaporization flow channel that serves as a raw material vaporizer that vaporizes a raw material for a reforming reaction, and as a flow channel that supplies the vaporized raw material to the reforming reaction chamber 31. The first flow channel 51 opens at an inlet 51a in a pipe line connecting region of the remover ceramic part 12, meanders with the width extending in the second direction y in the remover ceramic part 12, extends through the connecting portion ceramic part 13 to the reformer ceramic part 11, meanders with the width extending in the second direction y in the reformer ceramic part 11, and opens at an outlet 51b on the surface portion constituting one side in the thickness direction of the reformer ceramic part 11 that faces the reforming reaction chamber 31. At the outlet 51b, the first flow channel 51 is connected to an upstream side end portion of the flow channel of the reforming reaction chamber 31 that is formed by the reformer fins 25. Also, the first flow channel 51 is formed such that the channel meanders at least in the respective regions in which the reformer combustion chamber 30 and the remover combustion chamber 34 are provided as viewed on a projected plane perpendicular to the third direction z.

As used herein, the pipe line connecting region refers to a region for connecting, to the reaction apparatus 1, a pipe line for guiding a raw material for a reforming reaction from a supply source to the reaction apparatus 1 that is comprised of a pipe 22 or the like, a pipe line for supplying a product produced by the reaction apparatus 1 to the fuel cell 3 as fuel, a pipe line for guiding a raw material that is necessary for the CO removing reaction in the removing reaction chamber 35 from a supply source, a pipe line for guiding a raw materiel for combustion reaction from a supply source, a pipe line for guiding a product generated as a result of the combustion reaction in the reformer combustion chamber 30 to the discharge location, a pipe line for guiding a raw material for combustion reaction from a supply source, and a pipe line for guiding a product generated as a result of the combustion reaction in the reformer combustion chamber 30 to the discharge location.

Such a pipe line connecting region is preferably provided in, for example, a region of the surface portion constituting the other side in the thickness direction of the remover ceramic part 12. That is, by providing the pipe line connecting region in the remover ceramic part 12 in which a reaction occurs in a temperature range that is lower than the reforming reaction, rather than in the reformer ceramic part 11 in which a high temperature reaction takes place, stress caused by a difference in thermal expansion in a connecting portion between the pipe lines and the remover ceramic part 12 can be reduced, and damage to the connecting portion can be effectively suppressed.

The inlet 51a of the first flow channel 51 is connected to a pipe line that guides a raw material for a reforming reaction from a supply source. The amount of heat required by the raw material vaporizer is the amount required to heat the raw material to the boiling point of the raw material. In the case where the raw material is an aqueous methanol solution, it is sufficient that the aqueous methanol solution is heated to about 100° C. to 120° C. Accordingly, even when the periphery of the first flow channel 51 is made of a material that has a thermal conductivity relatively lower than metals, such as ceramic, the periphery can be heated sufficiently. Further, the first flow channel 51 overlays the reformer 4 and the CO remover 5 in which reactions take place at a temperature higher than in the raw material vaporizer as viewed from above from the third direction z, so that the raw material can be vaporized by excess heat from the reformer combustion chamber 30 and the remover combustion chamber 34 that heat the reformer 4 and the CO remover 5, respectively, and by excess heat from the heaters 48 and 49. Also, the first flow channel 51 can be housed in a thin substrate, such as the ceramic substrate 14.

The second flow channel 52 is a flow channel that guides a fluid containing a product (hydrogen) and carbon monoxide generated as a result of the reforming reaction in the reforming reaction chamber 31 to the removing reaction chamber 35. The second flow channel 52 opens at an inlet 52a on the surface portion constituting one side in the thickness direction of the reformer ceramic part 11 that faces the reforming reaction chamber 31, extends through the connecting portion ceramic part 13 to the remover ceramic part 12, and opens at an outlet 52b on the surface portion constituting one side in the thickness direction of the remover ceramic part 12 that faces the removing reaction chamber 35. At the inlet 52a, the second flow channel 52 is connected to a downstream side end portion of the flow channel of the reforming reaction chamber 31 that is formed by the reformer fins 25. At the outlet 52b, the second flow channel 52 is connected to an upstream-side end portion of the continuous flow channel of the removing reaction chamber 35 that is formed by the remover fins 27 and the auxiliary fins 40. The second flow channel 52 is a communicating path that allows communication between the reforming reaction chamber 31 and the removing reaction chamber 35, and is formed so as to extend through the connecting portion 6.

The third flow channel 53 is a flow channel for delivering, from the reaction apparatus 1 to the outside, a final product produced through removal of carbon monoxide from the product generated as a result of the reforming reaction in the reforming reaction chamber 31 by the CO removing reaction in the removing reaction chamber 35. The third flow channel 53 is formed so as to extend in the third direction z that is the thickness direction of the remover ceramic part 12, with an inlet 53a opening on the surface portion constituting one side in the thickness direction of the remover ceramic part 12 that faces the removing reaction chamber 35 and an outlet opening in the pipe line connecting region, and the channel penetrating through the ceramic substrate 14. At the inlet 53a, the third flow channel 53 is connected to a downstream side end portion of the continuous flow channel of the removing reaction chamber 35 that is formed by the remover fins 27 and the auxiliary fins 40. The outlet 53b of the third flow channel 53 is connected to the pipe 22 for supplying a product produced by the reaction apparatus 1 to the fuel cell 3 as fuel.

The fourth flow channel 54 is a flow channel that supplies a raw material (oxygen or air), necessary for the CO removing reaction in the removing reaction chamber 35, to the removing reaction chamber 35. The raw material supplied to the removing reaction chamber 35 by the fourth flow channel 54 is mixed with the product that is guided from the reforming reaction chamber 31 by the second flow channel 52. The fourth flow channel 54 opens at an inlet 54a in the pipe line connecting region, meanders with the width extending in the second direction y in the remover ceramic part 12, and opens on the surface portion constituting one side in the thickness direction of the remover ceramic part 12 that faces the removing reaction chamber 35. At an outlet 54b, the fourth flow channel 54 is connected to the upstream-side end portion of the continuous flow channel of the removing reaction chamber 35 that is formed by the remover fins 27 and the auxiliary fins 40. Also, the fourth flow channel 54 is formed such that the channel meanders at least in the region in which the remover combustion chamber 34 is provided as viewed on a projected plane perpendicular to the third direction z. The inlet 54a of the fourth flow channel 54 is connected to a pipe that guides, from a supply source, a raw material that is necessary for the CO removing reaction in the removing reaction chamber 35 and is to be mixed with the product that is guided from the reforming reaction chamber 31.

The fifth flow channel 55 is a flow channel that supplies a raw material for combustion reaction to the reformer combustion chamber 30. The fifth flow channel 55 opens at an inlet 55a in the pipe line connecting region, meanders with the width extending in the second direction y in the remover ceramic part 12, extends through the connecting portion ceramic part 13 to the reformer ceramic part 11, meanders with the width extending in the second direction y in the reformer ceramic part 11, and opens at an outlet 55b, on the surface portion constituting one side in the thickness direction of the reformer ceramic part 11 that faces the reformer combustion chamber 30. At the outlet 55b, the fifth flow channel 55 is connected to an upstream side end portion of the flow channel of the reformer combustion chamber 30 that is formed by the reformer sectioning member 32. Also, the fifth flow channel 55 is formed such that the channel meanders at least in the respective regions in which the reformer combustion chamber 30 and the remover combustion chamber 34 are provided as viewed on a projected plane perpendicular to the third direction z. The inlet 55a of the fifth flow channel 55 is connected to a pipe that guides a raw material for combustion reaction from a supply source.

The sixth flow channel 56 is a flow channel for discharging a fluid obtained after the combustion reaction in the reformer combustion chamber 30 from the reaction apparatus 1. The sixth flow channel 56 opens at an inlet 56a on the surface portion constituting one side in the thickness direction of the reformer ceramic part 11 that faces the reformer combustion chamber 30, extends through the connecting portion ceramic part 13 to the remover ceramic part 12, and opens at an outlet 56b in the pipe line connecting region. At the inlet 56a, the sixth flow channel 56 is connected to a downstream side end portion of the flow channel of the reformer combustion chamber 30 that is formed by the reformer sectioning member 32. The outlet 56b of the sixth flow channel 56 is connected to a pipe tor guiding a product produced as a result of the combustion reaction in the reformer combustion chamber 30 to the discharge location.

The seventh flow channel 57 is a flow channel that supplies a raw material for combustion reaction to the remover combustion chamber 34. The seventh flow channel 57 opens at an inlet 57a in the pipe line connecting region, meanders in the second direction y in the remover ceramic part 12, and opens at an outlet 57b on the surface portion constituting one side in the thickness direction of the remover ceramic part 12 that faces the remover combustion chamber 34. At the outlet 57b, the seventh flow channel 57 is connected to an upstream-side end portion of the flow channel of the remover combustion chamber 34 that is formed by the remover sectioning member 36. Also, the seventh flow channel 57 is formed such that the channel meanders at least in the region in which the remover combustion chamber 34 is provided as viewed on a projected plane perpendicular to the third direction z. The inlet 57a of the seventh flow channel 57 is connected to a pipe that guides a raw material for combustion reaction from a supply source.

The eighth flow channel 58 is a flow channel for discharging a fluid obtained after the combustion reaction in the remover combustion chamber 34 from the reaction apparatus 1. The eighth flow channel 58 opens at an inlet 58a on the surface portion constituting one side in the thickness direction of the remover ceramic part 12 that faces the remover combustion chamber 34, and opens at an outlet 58b in the pipe line connecting region. At the inlet 58a, the eighth flow channel 58 is connected to a downstream side end portion of the flow channel of the remover combustion chamber 34 that is formed by the remover sectioning member 36. The outlet 58b of the eighth flow channel 58 is connected to a pipe for guiding a product produced as a result of the combustion reaction in the reformer combustion chamber 30 to the discharge location. Pipes 22 are connected to the inlets 51a, 54a, 55a and 57a, and the outlets 53b, 56b and 58b. The pipes 22 each penetrate through the heat insulating package 21 while maintaining the airtightness of the heat insulating package 21, and are connected to a raw material container 60, which will be described later, and the fuel cell 3. A wiring that supplies voltage to the heaters 48 and 49 also penetrates through the heat insulating package 21 while maintaining the airtightness of the heat insulating package 21. In the case where the heat insulating package 21 is an electrically conductive member, such as a metal member, in order to prevent the wiring that supplies voltage to the heaters 48 and 49 from being shorted via the heat insulating package 21, in the through hole through which the wiring penetrates through the heat insulating package 21, the periphery of the wiring is preferably sealed with an insulating material, such as a ceramic or low melting point glass.

The ceramic substrate 14, in which the heaters 48 and 49 are provided and the substrate's interior flow channel 50 is formed, is formed by laminating a plurality of ceramic layers. The ceramic substrate 14 is molded by sintering a plurality of unsintered material layers, for example, a laminate of green sheets. As the unsintered material, alumina ($Al_2O_3$), aluminum nitride (AlN), a glass ceramic powder (a mixture of a glass powder and a filler powder) or the like can be used. The heaters 48 and 49 are embedded in the ceramic substrate 14 by being sandwiched between material layers when laminating unsintered material layers, and then sintering. Also, apertures and grooves are formed in appropriate locations of the unsintered material layers, and the material layers in which such apertures and grooves have been formed are laminated, followed by sintering, and, thereby, a complicated interior flow channel 50 is formed in the interior of the ceramic substrate 14.

With reference to FIGS. 1, 3 and 10, the fuel cell system 2 includes a raw material container 60 that stores a raw material, the above-described reaction apparatus 1 that generates hydrogen by a chemical reaction of the raw material stored in the raw material container 60, and a fuel cell 3 that generates power through an electrochemical reaction between oxygen and hydrogen. The raw material stored in the raw material container 60 can be a compound (hereinafter referred to as "hydrogen compound") that contains a hydrogen atom in the chemical composition thereof, such as an alcohol, including methanol, ethanol or the like, or gasoline or the like, and water. The hydrogen compound and water are stored in separate spaces in the raw material container 60. In the present embodiment, methanol is used as a raw material.

In the reaction apparatus 1, the methanol and water stored in the raw material container 60 serving as a supply source are guided in a mixed state to the inlet of the first flow channel 51, vaporized while flowing through the first flow channel 51, and then supplied to the reforming reaction chamber 31. In the reforming reaction chamber 31, a reforming reaction through which a gas mixture of methanol and water is reformed into hydrogen is performed in a manner as represented by Chemical Reaction Formulas (1) and (2).

$$CH_3OH + H_2O \rightarrow 3H_2 + CO_2 \quad (1)$$

$$H_2 + CO_2 \cdot H_2O + CO \quad (2)$$

Because the catalyst and the like provided in the fuel cell 3 will be negatively affected if a fluid that is supplied to the fuel cell 3 contains carbon monoxide, in order to remove carbon monoxide, the product produced by the reforming reaction chamber 31 is guided to the removing reaction chamber 35 by the second flow channel 52. In the removing reaction chamber 35, as shown by Chemical Reaction Formula (3), carbon monoxide contained in the gas mixture produced by the reforming reaction chamber 31 is selectively oxidized with oxygen that is supplied as a raw material by the fourth flow channel 54 to remove the carbon monoxide. This oxidation reaction is a CO removing reaction. Ambient air is drawn and the oxygen contained in the drawn ambient air is utilized. Accordingly, the fourth flow channel 54 utilizes the external space of the reaction apparatus 1 as a supply source, drawing air and supplying the air.

$$2CO + O_2 \rightarrow 2CO_2 \quad (3)$$

The final product (or in other words, hydrogen and carbon dioxide) that is produced by removing carbon monoxide by the oxidation reaction in the removing reaction chamber 35 from the product (or in other words, hydrogen, carbon dioxide and carbon monoxide), which is produced by the reforming reaction in the reforming reaction chamber 31, is delivered from the reaction apparatus 1 through the third flow channel 53 and supplied to the fuel cell 3.

The removing reaction chamber 35, which is a low temperature reaction chamber, is a reaction chamber in which a reaction takes place at a temperature lower than that in the reforming reaction chamber 31, which is a high temperature reaction chamber. In the reforming reaction chamber 31, the reaction is performed at a temperature of, for example, 350° C., and in the removing reaction chamber 35, the reaction is performed at a temperature of, for example, 150° C.

The fuel cell 3 includes a fuel electrode that carries very fine catalyst particles, an air electrode that carries fine catalyst particles, and a film-like solid polymer electrolyte membrane that is interposed between the fuel electrode, and the air electrode. To the fuel electrode of the fuel cell 3, a gaseous mixture of hydrogen and carbon dioxide is supplied from the reaction apparatus 1, and to the air electrode of the fuel cell 3, air is supplied from the outside. In the fuel electrode, as shown by Electrochemical Reaction Formula (4), hydrogen contained in the gas mixture is divided into hydrogen ions and electrons by the action of the catalyst particles of the fuel electrode. Hydrogen ions migrate through the solid polymer electrolyte membrane to the oxygen electrode, and electrons are taken out by the fuel electrode. In the oxygen electrode, as shown by electrochemical reaction formula (5), the electrons that have migrated to the oxygen electrode, oxygen in the air, and the hydrogen ions that have passed through the solid polymer electrolyte membrane react to produce water.

$$H_2 \rightarrow 2H^+ + 2e^- \quad (4)$$

$$2H^+ + \tfrac{1}{2}O_2 + e^- \rightarrow H_2O \quad (5)$$

The fuel cell 3 generates power through such an electrochemical reaction.

The reformer combustion chamber 30 generates heat to facilitate the reforming reaction in the reforming reaction chamber 31. Also, the heat generated by the reformer combustion chamber 30 is supplied to the substrate's interior flow channel 50. Thus, the raw material that flows through the substrate's interior flow channel 50 is heated. To the reformer combustion chamber 30, a fluid containing hydrogen and oxygen is supplied as a raw material through the fifth flow channel 55. Hydrogen combusted in the reformer combustion chamber 30 can use residual hydrogen, which did not cause an electrochemical reaction in the fuel cell 3 and is left over, from the hydrogen contained in the product produced through the reforming reaction chamber 31 and the removing reaction chamber 35, or in other words, unreacted hydrogen contained in an off-gas that is a gas discharged from the fuel cell 3. In this case, hydrogen is supplied from the reforming reaction chamber 31 and the removing reaction chamber 35 via the fuel cell. At this time, carbon dioxide produced in the removing reaction chamber 35 may be supplied together with hydrogen, or only hydrogen extracted from the product may be supplied. Similar to the oxygen utilized in the oxidation reaction in the removing reaction chamber 35, ambient air is drawn and the oxygen contained in the drawn ambient air is utilized. The combustion exhaust gas that is a product produced by this combustion reaction is discharged to the outside through the sixth flow channel 56. Because the reformer combustion chamber 30 recycles unreacted hydrogen that is contained, in the off-gas that is discharged from the fuel cell 3 as described above, it takes some time before combustion starts, but the heater 48 can rapidly heat the reforming reaction chamber 31 to a degree at which the reforming reaction can take place upon start up of the fuel cell system 2, or in other words, before hydrogen is supplied to the fuel cell 3, so that the fuel cell 3 can rapidly generate power.

Furthermore, the remover combustion chamber 34 generates heat to facilitate the oxidation reaction in the removing reaction chamber 35. The heat generated by the remover combustion chamber 34 is propagated to the substrate's interior flow channel 50. Thus, the raw material that flows through the substrate's interior flow channel 50 is heated. To the remover combustion chamber 34, a fluid containing hydrogen and oxygen is supplied as a raw material through the seventh flow channel 57. Hydrogen combusted in the remover combustion chamber 34 can use unreacted hydrogen contained in an off-gas, which is residual hydrogen that did not cause an electrochemical reaction in the fuel cell 3 and is left over, from the hydrogen contained in the product produced through the reforming reaction chamber 31 and the removing reaction chamber 35. In this case, hydrogen is supplied from the reforming reaction chamber 31 and the removing reaction chamber 35 via the fuel cell 3. At this time, carbon dioxide produced in the removing reaction chamber 35 may be supplied together with hydrogen, or only hydrogen extracted from the product may be supplied. Similar to the oxygen utilized in the oxidation reaction in the removing reaction chamber 35, ambient air is drawn and the oxygen contained in the drawn ambient air is utilized. The combustion exhaust gas that is a product produced by this combustion reaction is discharged to the outside through the eighth flow channel 58. Because the remover combustion chamber 34 recycles unreacted hydrogen that is contained in an off-gas that is discharged from the fuel cell 3 as described above, it takes some time before combustion starts, but the heater 49 can rapidly heat the removing reaction chamber 35 to a degree at which the carbon monoxide removing reaction can take place upon start-up of the fuel cell system 2, or in other words, before hydrogen is supplied to the fuel cell, so that the fuel cell 3 can rapidly generate power.

Because the combustion reactions of the reformer combustion chamber 30 and the remover combustion chamber 34 do not occur easily in the initial stage upon start-up of the reaction apparatus 1, in order to help this, heaters 48 and 49 are provided. Thus, The heaters 48 and 49 are activated in at least the initial stage upon start-up of the reaction apparatus 1, but it is also possible to employ a configuration in which these heaters are continuously activated after the initial stage. The heaters 48 and 49 are provided, as viewed on a projected plane perpendicular to the third direction z, in respective regions in which the reformer combustion chamber 30 and the remover combustion chamber 34 are provided. The heaters 48 and 49 may be provided on the one side in the thickness direction above the substrate's interior flow channel 50, but in the present embodiment, these heaters are provided on the other side in the thickness direction below the substrate's interior flow channel 50.

According to the present embodiment, because the reaction apparatus 1 includes the reformer 4 and the CO remover 5, it is possible to perform a high temperature reforming reaction in the reformer 4 and a low-temperature CO removing reaction in the CO remover 5. The reformer 4 and the CO remover 5 are connected only with the connecting portion 6 that has a width in the second direction y smaller than the width of the reformer 4 and the CO remover 5, so that heat transfer between these components is small, resulting in little thermal influence between these components. Therefore, the high-temperature chemical reaction in the reformer 4 and the low-temperature chemical reaction in the CO remover 5 can be achieved in a suitable manner. Furthermore, according to the present embodiment, the reformer 4 is configured with a combination of the ceramic part 11 and the metallic reformer lid member 15, and the CO remover 5 is configured with a combination of the ceramic part 12 and the remover lid member 16. Because ceramic has superior heat resistance and corrosion resistance, and a thermal conductivity lower than metals, silicon, and the like, by using the ceramic parts 11 and 12, a suitable reaction apparatus that has superior heat resistance and corrosion resistance and less heat leakage to the outside can be achieved. In addition, metals have superior workability, and can be formed into complicated shapes with ease. Accordingly, by combining the ceramic part 11, 12 with the reformer lid member 15, and the remover lid member 16, it is possible to achieve a suitable reaction apparatus that has superior heat resistance and corrosion resistance and less heat leakage to the outside, with an internal structure having a complicated shape that facilitates chemical reactions.

Furthermore, in the present embodiment, because both the reformer 4 and the CO remover 5 are configured with a combination of the ceramic part 11, 12 and the reformer lid members 15 and the remover lid member 16, a more suitable reaction apparatus can be achieved. Even when either one of the reformer 4 and the CO remover 5 is configured with a combination of a ceramic substrate and a metal part, a suitable reaction apparatus can be achieved.

Further, the ceramic substrate 14 is molded by sintering a multi-layered material, and the ceramic substrate 14 in which the heaters 48 and 49 are embedded can be produced by sandwiching the heaters 48 and 49 with unsintered material, followed by sintering. Because the heaters 48 and 49 can be embedded simultaneously when molding the ceramic substrate 14, the number of production steps can be reduced, simplifying the production. Also, the ceramic substrate 14 has superior heat retention properties to metals, so that heat from the heaters 48 and 49 can be dissipated efficiently.

In the reformer 5, the reforming reaction chamber 31 and the reformer combustion chamber 30 are arranged adjacent to each other with the reformer partition 26 between these chambers. With this configuration, heat generated by the reformer combustion chamber 30 can be easily supplied to the reforming reaction chamber 31. Likewise, in the CO remover 5, the removing reaction chamber 35 and the remover combustion chamber 34 are arranged adjacent to each other with the remover partition 28 between these chambers. With this configuration, heat generated by the remover combustion chamber 34 can be easily supplied to the removing reaction chamber 35. Accordingly, heat can be efficiently supplied to the raw material when the material is chemically reacted in the reforming reaction chamber 31 and the removing reaction chamber 35.

Reformer fins 25 that are connected to the reformer partition 26 to form a flow channel in the reforming reaction chamber 31 are provided. With the reformer fins 25 connected to the reformer partition 26, heat generated by the reformer combustion chamber 30 that is a heat generating portion is easily conducted via the reformer partition 26. Also, by forming a flow channel with the fins, it is possible to efficiently supply heat to the raw material in the flow channel. Likewise, the remover fins 27 that are connected to the remover partition 28 to form a flow channel in the removing reaction chamber 35 are provided. With the remover fins 27 connected to the remover partition 28, heat generated by the remover combustion chamber 34, which is a heat generating portion, is easily conducted via the remover partition 28. Also, by forming a flow channel with the fins, it is possible to efficiently supply heat to the raw material in the flow channel.

Furthermore, in the present embodiment, the reformer fins 25 and the remover fins 27, as described above, are both formed on the partition, so that a more suitable reaction apparatus can he achieved. Even when at least one of the reformer fins 25 and the remover fins 71 is formed on the partition, a suitable reaction apparatus can be achieved.

In addition, the reformer fins 25 are spaced apart from the inner surfaces that define the reformer 4, namely, for example, the reformer lid member 15, except for the surface of the reformer partition 26 of the reformer 4. With this configuration, it is possible to make thermal conduction from the reformer fins 25 to the members that form the reformer 4 other than the reformer partition 26 difficult, and to prevent heat from leaking to the outside. Further, it is preferable that the distance between the reformer fins 25 and the reformer lid member 15 is 0.05 m or more and 0.3 mm or less. With this configuration, the effect of heat leakage to the outside can be exerted sufficiently.

The remover fins 27 are spaced apart from the inner surfaces that define the CO remover 5, namely, for example, the remover lid member 16, except for the surface of the remover partition 28 of the CO remover 5. With this configuration, it is possible to make thermal conduction from the remover fins 27 to the members that form the CO remover 5 other than the remover partition 28 difficult, and to prevent heat from leaking to the outside. It is preferable that the distance between the remover fins 27 and the remover lid member 16 is 0.05 mm or more and 0.3 mm or less. With this configuration, the effect of the heat leakage to the outside can be exerted sufficiently.

The fins are connected to the partition by spot welding, so that the fins can be provided easily.

In the interior of the ceramic substrate 14, the substrate's interior flow channel 50, through which a fluid that is involved in the chemical reaction of the reformer 4 and the CO remover 5 flows, is formed. By employing a configuration in which a fluid involved in the chemical reaction, namely, for example, hydrogen flows through the flow channel 50, the fluid involved in the chemical reaction can be pretreated. This pretreatment can be, but is not limited to, for example, preheating, vaporization, etc.

The ceramic substrate 14 is formed of a laminate of a plurality of ceramic layers. Such a ceramic substrate 14 is formed by laminating ceramic material layers, followed by sintering. Accordingly, by forming grooves, apertures and the like in each ceramic material layer, laminating the ceramic material layers and sintering the resultant, a ceramic substrate in which a flow channel hermetically insulated from the outside is formed can be achieved.

In the reaction apparatus 1, the respective ceramic parts 11, 12 and 13 of the reformer 4, the CO remover 5, and the connecting portion 6 are configured as a single-piece structured ceramic substrate 14. With this configuration, the number of components can be reduced, allowing easy assembly and providing a high strength. In addition, the ceramic substrate 14 includes a narrow portion constituting the connecting portion 6 between wide portions constituting the reformer 4 and the CO remover 5. With this configuration, the cross sectional area of the connecting portion 6 that connects the reformer 4 and the CO remover 5 can be reduced. Accordingly, heat transfer between the reformer 4 and the CO remover 5 can be suppressed at a low level.

Figure 11:
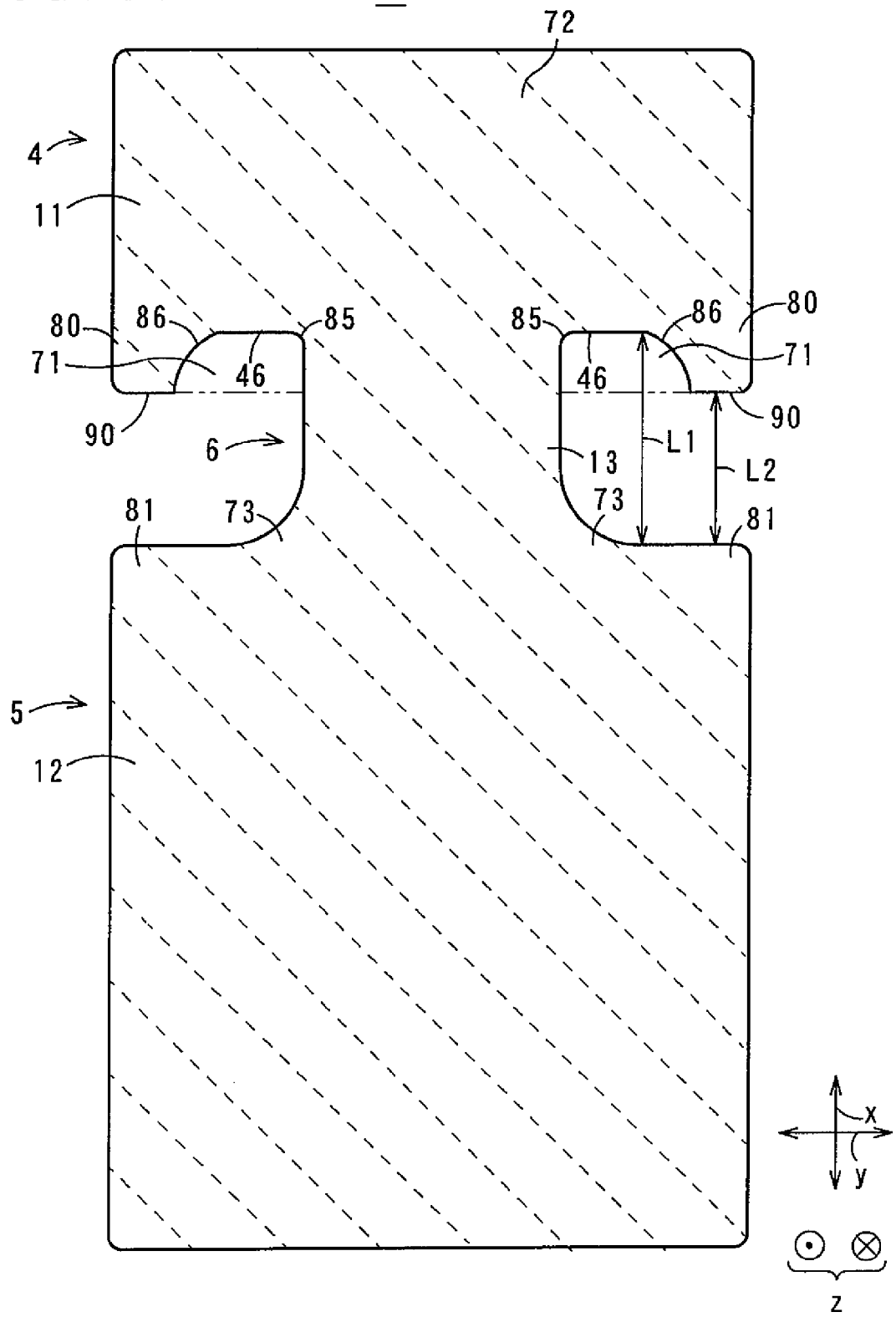
FIG. 11 is a cross-sectional view of the ceramic substrate taken on a line S11-S11 of FIG. 1.
Figure 12:
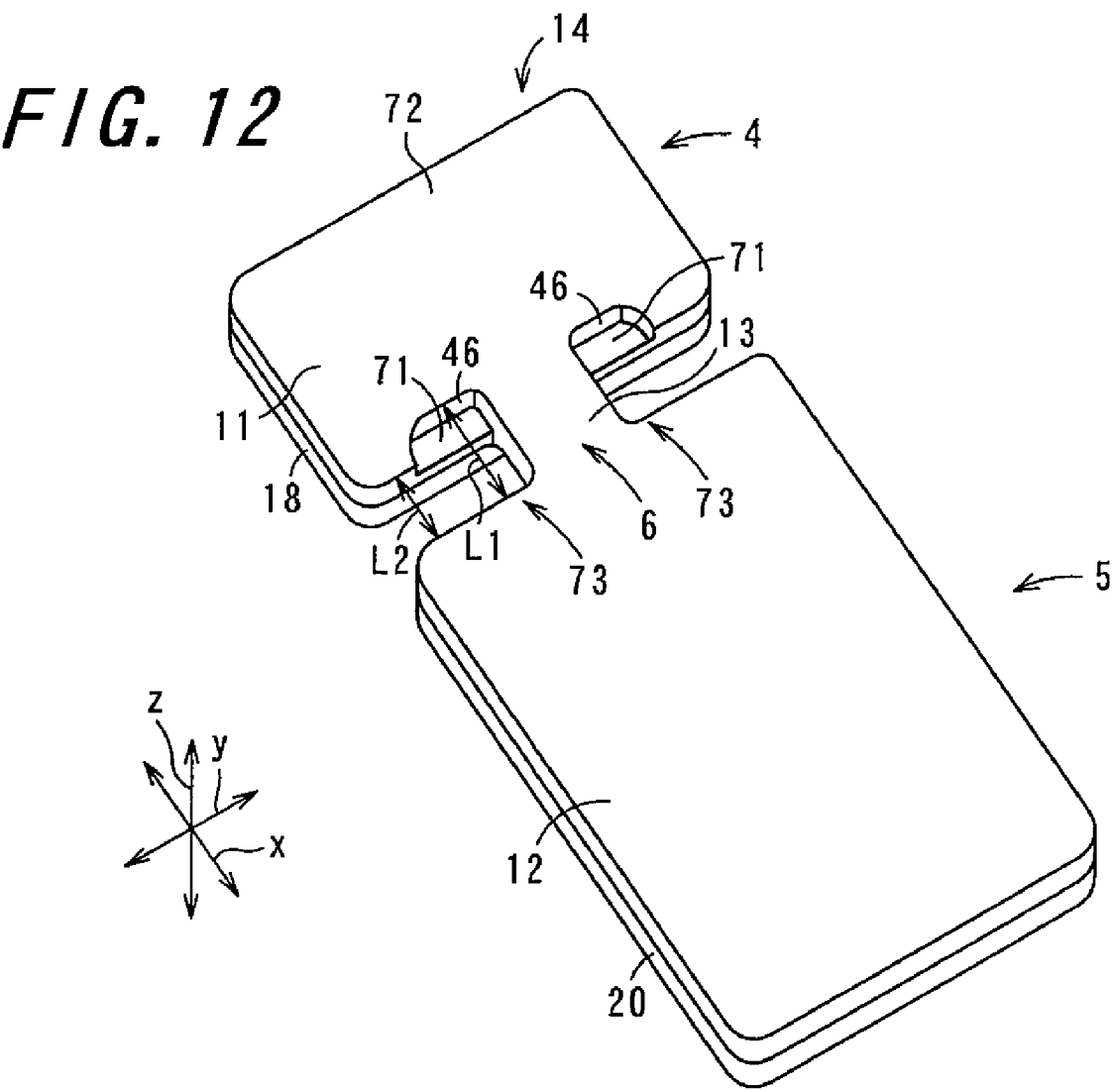
FIG. 12 is a perspective view of the ceramic substrate as viewed from the other side in the thickness direction z of the ceramic substrate, in which the reformer connecting member, the remover connecting member and the like are disposed.

FIG. 11 is a cross-sectional view of the ceramic substrate 14 taken on a line S11-S11 of FIG. 1. FIG. 12 is a perspective view of the ceramic substrate 14 as viewed from the other side in the thickness direction z of the ceramic substrate 14, in which the reformer connecting member 18, the remover connecting member 20 and the like are provided. In each of the layers in contact with the upper and lower surfaces of the heaters 48 and 49 of the laminated ceramic layers of the ceramic substrate 14, recess portions 46 and 46 are provided such that the distance between reformer 4 and CO remover 5 is set to be longer (distance L1) in between peripheral regions (hereinafter also referred to as "connecting portion peripheral regions") 71 and 73 that are connected to the connecting portion 6, and is set to be shorter than the distance L1 and equal to a distance L2 between reformer 4 and CO remover 5 of an upper layer that are placed on the upper layer that is in contact with the heaters 48 and 49, in a portion distant from the connecting portion 6, specifically, in a region except for the connecting portion peripheral regions 71 and 73 of the reformer 4 and the CO remover 5. With this configuration, a protruding portion 90 that protrudes towards the CO removor 5 side is formed, in the second direction y, in an end facing region 80 of the remaining region except for the connecting portion peripheral region 71 of the reformer 4, the end facing region 80 being opposite to the CO remover 5. The recess portions 46 provided in the connecting portion peripheral regions 71 of the reformer 4 are each formed such that a first curve portion 85 that is connected to the connecting portion 6 has a radius of curvature relatively smaller than a second curve portion 86 that is connected to the protruding portion 90.

As a result of providing the recess portions 46, the distance L1 between reformer 4 and CO remover 5 in between the connecting portion peripheral regions 71 and 73 becomes longer than the distance L2 between reformer 4 and CO remover 5 in between the end facing regions 80 and 81 that face each other in the second direction y of the remaining region except tor the connecting portion peripheral regions 71 and 73. As used herein, "the distance between reformer 4 and CO remover 5 in between the connecting portion peripheral regions 71 and 73" refers to, with respect to the surface portion that faces the remover ceramic part 12 in the recess portion 46 provided in a connecting portion peripheral region 71 of the reformer ceramic part 11, the longest distance from that surface portion to the surface portion of a connecting portion peripheral region 73 of the remover ceramic part 12 that faces the reformer ceramic part 11. Likewise, "the distance between reformer 4 and CO remover 5 in between the end facing regions 80 and 81" refers to the distance between the surface portion of the protruding portion 90 that is formed in an end facing region 80 of the reformer ceramic part 11 and faces the remover ceramic part 12 and the surface portion of an end facing region 81 of the remover ceramic part 12 that faces the reformer ceramic part 11.

As a result of such a configuration, the thickness in the third direction z of the peripheral region 71 that is connected to the connecting portion 6 of the reformer ceramic part 11 of the ceramic substrate 14 is smaller than the thickness in the third direction z of other regions of the reformer ceramic part 11, namely, for example, the thickness in the third direction of a center region 72. Accordingly, in the ceramic layers in contact with the heaters 48 and 49, the length in the first direction x of the reformer ceramic part 11 becomes short, and the length in the first direction x of the connecting portion ceramic part 13 becomes relatively large. Further, as for the reformer ceramic part 11, the cross-sectional area of a plane that is parallel to the second direction y and the third direction z of the connecting portion peripheral region 71, or in other words, the cross-sectional area in the thickness direction of the reformer ceramic part 11 is set to be smaller than the cross-sectional area in the thickness direction of the center region 72. Accordingly, it is possible to suppress the propagation of heat from the heater 48 of the reformer 4, that is heated to a temperature higher than the temperature to which the heater 49 of the CO remover 5 is heated; and the propagation of heat from the reformer combustion chamber 30 of the reformer 4, that is heated to a temperature higher than the temperature to which the remover combustion chamber 34 of the CO remover 5 is heated; to the CO remover 5 via the connecting portion ceramic part 13.

Figure 13:
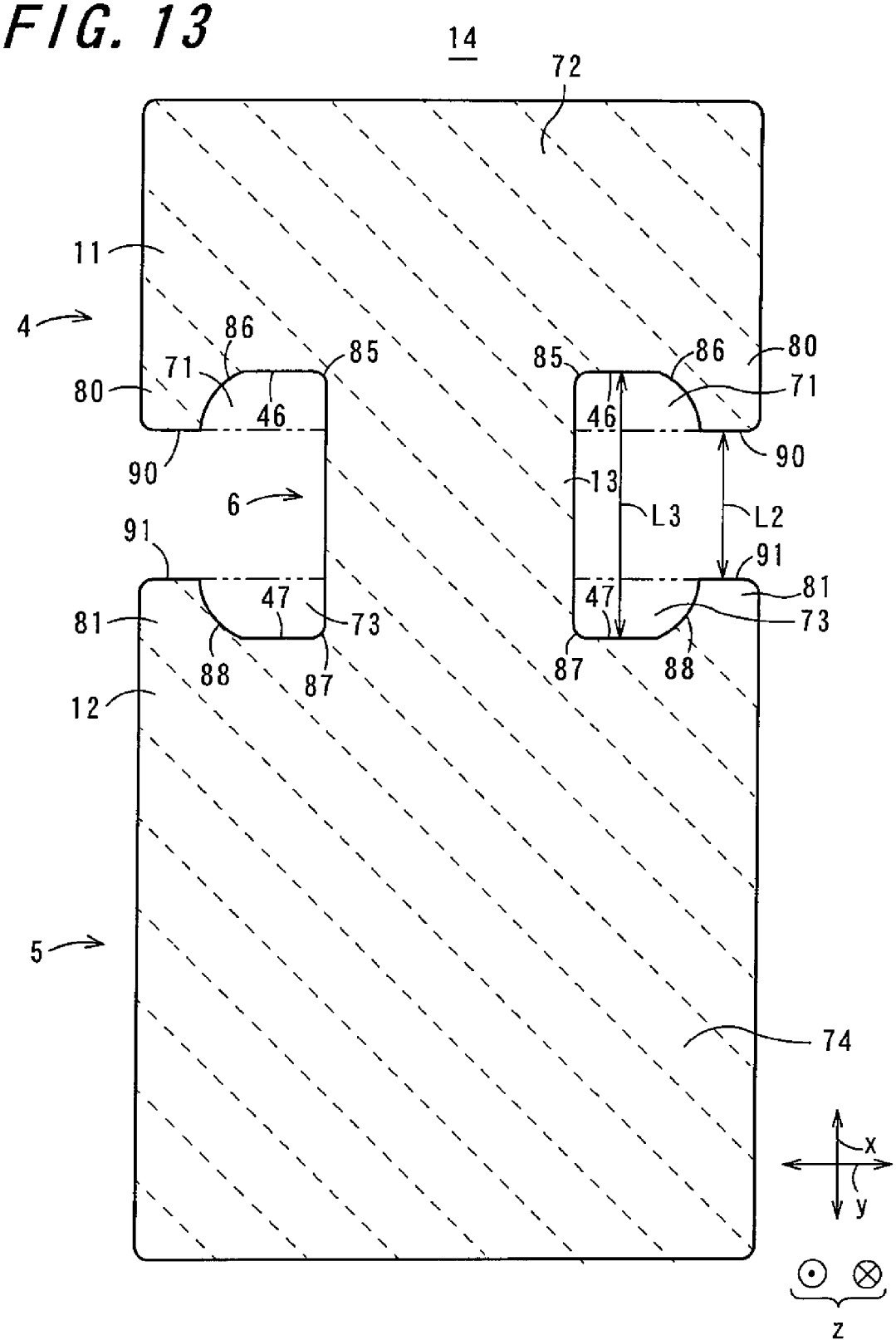
FIG. 13 is a cross-sectional view of the ceramic substrate taken on the line S11-S11 of FIG. 1 in a deformed example.

Furthermore, the structure of the layers in contact with the upper and lower surface of the heaters 48 and 49 of the laminated ceramic layers of the ceramic substrate 14 is not limited to the structure shown in FIG. 11, and may be as shown in FIG. 13. That is, it is possible to employ a configuration in which recess portions 46 and 46 are provided in the reformer ceramic part 11 and recess portions 47 and 47 are provided in the remover ceramic part 12 such that the distance between reformer 4 and CO remover 5 is set to he longer (distance L3) in a portion close to the connecting portion 6, or in other words, between the connecting portion peripheral regions 71 and 73, and is set to be (shorter than the distance L3) equal to a distance L2 between reformer 4 and CO remover 5 of an upper layer that are placed on the upper layer that is in contact with the heaters 48 and 49, in a portion distant from the connecting portion 6, specifically, between the end facing regions 80 and 81. By providing the recess portions 46 in the reformer ceramic part 11, protrusion portions 90 are formed similar to FIG. 11, and by providing the recess portions 47 in the remover ceramic part 12, protrusion portions 91 that protrude towards the reformer 4 side are formed in the end facing regions 81 of the CO remover 5. The recess portions 47 provided in the connecting portion peripheral regions 73 of the CO remover 5 are each formed such that a first curve portion 87 that is connected to the connecting portion 6 has a radius of curvature relatively smaller than a second curve portion 88 that is connected to the protruding portion 91.

As a result of providing the recess portions 46 and 46 in the reformer ceramic part 11 and the recess portions 47 and 47 in the remover ceramic part 12, the distance L3 between reformer 4 and CO remover 5 in between the connecting portion peripheral regions 71 and 73 becomes longer than the distance L2 between reformer 4 and CO remover 5 in between the end facing regions 80 and 81 of the remaining regions except tor the connecting portion peripheral regions 71 and 73. Accordingly, the thickness in the third direction z of the peripheral region 71 that is connected to the connecting portion 6 of the reformer ceramic part 11 of the ceramic substrate 14 becomes smaller than the thickness in the third direction z of other regions of the reformer ceramic part 11, namely, for example, the thickness in the third direction z of a center region 72; and also, the thickness in the third direction z of the peripheral region 73 that is connected to the connecting portion 6 of the remover ceramic part 12 of the ceramic substrate 14 becomes smaller than the thickness in the third direction 2 of other regions of the remover ceramic part 12, namely, for example, the thickness in the third direction z of the a center region 74. Accordingly, in the layers in contact with the upper and lower surfaces of the heaters 48 and 49, the lengths in the first direction x of the reformer ceramic part 11 and the remover ceramic part 12 become short, and the length in the first direction x of the connecting portion ceramic part 13 becomes relatively large. As for the reformer ceramic part 11, the cross-sectional area of a plane that is parallel to the second direction y and the third direction z of the connecting portion peripheral region 71, or in other words, the cross-sectional area in the thickness direction of the reformer ceramic part 11 is set to be smaller than the cross sectional area in the thickness direction of the center region 72. Likewise, for the remover ceramic part 12, the cross-sectional area of a plane that is parallel to the second direction y and the third direction z of the connecting portion peripheral region 73, or in other words, the cross-sectional area in the thickness direction of the remover ceramic part 12 is set to be smaller than the cross-sectional area in the thickness direction of the center region 74. Therefore, it is possible to suppress the propagation of heat from the heater 48 of the reformer 4, that is heated to a temperature higher than the temperature to which the heater 49 of the CO remover 5 is heated; and the propagation of heat from the reformer combustion chamber 30 of the reformer 4, that is heated to a temperature higher than the temperature to which the remover combustion chamber 34 of the CO remover 5 is heated; to the CO remover 5 via the connecting portion ceramic part 13.

In the description given above, in the reformer 4, or in the reformer 4 and the CO remover 5, a configuration is employed in which a recess portion is provided in a ceramic part near the connecting portion 6, a cross-sectional area near the connecting portion 6 is reduced, and a length of the connecting portion 6 is increased so as to easily maintain the temperature difference between the reformer 4 and the CO remover 5. However, the same configuration may be employed in only the CO remover 5, that is, a recess portion is provided in a ceramic part near the connecting portion 6, a cross-sectional area near the connecting portion 6 is reduced, and a length of the connecting portion 6 is increased.

The narrow portion of the ceramic substrate 14, or in other words, the portion of the connecting portion 6 that is connected at least to each wide portion, or in other words, the portions that are connected to the reformer 4 and the CO remover 5 are formed to have an incurve without sharp angles and are connected seamlessly to the outer surface of the wide portions. As a result of this configuration, when an external force acts on the ceramic substrate 14, stress applied to the connecting portion between each wide portion and the narrow portion can be dispersed such that the stress does not concentrate on the connecting portion, and the strength of the ceramic substrate 14 can be increased.

When combining the ceramic part 11, 12 with the reformer lid member 15 and the remover lid member 16 that are made of materials having different properties, such as coefficient of thermal expansion, connecting members 18 and 20 are used to achieve good binding between the ceramic parts 11, 12 and the reformer lid member 15 and the remover lid member 16. By using the connecting members 18 and 20, it is possible to firmly connect the ceramic part and the metal part with ease.

The connecting members 18 and 20 have a coefficient of thermal expansion that falls between the coefficient of thermal expansion of the reformer lid member 15 and the remover lid member 16 and the coefficient of thermal expansion of the ceramic parts 11 and 12. Accordingly, the thermal stress generated in the connecting portions between the ceramic part 11, 12 and the connecting member 18, 20; and between the reformer lid member 15, the remover lid member 16 and the connecting member 18, 20; can be made smaller than the thermal stress generated in connecting portions obtained by directly connecting the ceramic parts 11 and 12 to the reformer lid member 15 and the remover lid member 16, respectively. Accordingly, the connecting strength between the ceramic part and the metal member can be increased.

The holders 29 and 33 have a coefficient of thermal expansion that falls between the coefficient of thermal expansion Of the partitions 26, 28 and the coefficient of thermal expansion of the ceramic parts 11, 12. Accordingly, the thermal stress generated in the connecting portions between the ceramic part 11, 12 and the holder 29, 33, and between the partition 26, 28 and the holder 29, 33 can be made smaller than the thermal stress generated in connecting portions obtained by directly connecting the ceramic parts 11, 12 and the partitions 26, 28, respectively. Accordingly, the connecting strength between the ceramic part and the partition can be increased.

The reformer combustion chamber 30 is formed inwardly spaced apart from the reformer connecting member 18. with this configuration, the reformer combustion chamber 30 is formed to be thermally insulated from the reformer connecting member 18, making it difficult for heat generated in the reformer combustion chamber 30 to leak to the outside. Also, by forming the reformer combustion chamber 30 spaced apart from the reformer connecting member 18, it is possible to prevent an external stress from being applied to the members that form the reformer combustion chamber 30 when connecting the reformer ceramic part 11 and the reformer lid member 15 with the reformer connecting member 18. As in the reformer combustion chamber 30, the remover combustion chamber 34 is also formed so as to be thermally insulated from the remover connecting member 20, making it difficult for heat generated in the remover combustion chamber 34 to leak to the outside and preventing an external stress from being applied to the members that form the remover combustion chamber 34.

On the inner side of the connecting members 18 and 20, the surface of the ceramic substrate 14 is elevated to form a projection. With this configuration, the length in the thickness direction of the reformer combustion chamber 30 and the remover combustion chamber 34 can be reduced, allowing the raw material to easily come into contact with the inner surfaces that define the reformer combustion chamber 30 and the remover combustion chamber 34. Accordingly, by depositing a catalyst onto the inner surfaces that define the reformer combustion chamber 30 and the remover combustion chamber 34, it is possible to allow the raw material to easily come into contact with the catalyst and increase reaction efficiency. In addition, it is unnecessary to reduce the thickness of the connecting members 18 and 20, so it is possible to prevent the strength of the connecting members 18 and 20 from decreasing.

The connecting portion of the ceramic substrate 14 surface with the connecting member 18, 20 is depressed to form a recess. With this configuration, the length in the thickness direction of the reformer combustion chamber 30 and the remover combustion chamber 34 can be reduced, allowing the raw material to easily come into contact with the inner surfaces that define the reformer combustion chamber 30 and the remover combustion chamber 34. Accordingly, by depositing a catalyst onto the inner surfaces that define the reformer combustion chamber 30 and the remover combustion chamber 34, it is possible to allow the raw material to easily come into contact with the catalyst and increase reaction efficiency. In addition, it is unnecessary to reduce the thickness of the connecting members 18 and 20, so that it is possible to prevent the strength of the connecting members 18 and 20 from decreasing.

The reformer combustion chamber 30 and the remover combustion chamber 34 that are formed inwardly spaced apart from the connecting members 18 and 20 are configured by connecting partitions to the ceramic substrata 14 on the inner side of the connecting members 18, 20 with the partition holders 29 and 33. With such a configuration, the reformer combustion chamber 30 and the remover combustion chamber 34 can be formed inwardly spaced apart from the connecting members 18 and 20.

The height of the partition holders 29 and 30 is smaller than that of the connecting members 18 and 20. With this configuration, the length in the thickness direction of the reformer combustion chamber 30 and the remover combustion chamber 34 can be reduced, allowing the raw material to easily come into contact with the inner surfaces that define the reformer combustion chamber 30 and the remover combustion chamber 34. Accordingly, by depositing a cataylst onto the inner surfaces that define the reformer combustion chamber 30 and the remover combustion chamber 34, it is possible to allow the raw material to easily come into contact with the catalyst and increase reaction efficiency. In addition, it is unnecessary to reduce the thickness of the connecting members 18 and 20, so that it is possible to prevent the strength of the connecting members 18 and 20 from decreasing.

The reformer 4 is a reaction portion in which a chemical reaction that produces hydrogen is performed. Thus, the reaction apparatus 1 can produce hydrogen. The CO remover 5 is a reaction portion in which a reaction that removes carbon monoxide is performed. Thus, by using the reaction apparatus 1, it is possible to prevent carbon monoxide from being supplied to a supply destination.

Furthermore, because the reaction product produced by the reaction apparatus 1 can be used as fuel in the fuel cell 3 to generate power, by allowing a raw material that is easier to handle than the fuel of the fuel cell 3 to react in the reaction apparatus 1, the resulting reaction product can be used as fuel of the fuel cell 3. Accordingly, the fuel cell 3 can generate power by storing a raw material that is easier to handle than the fuel of the fuel cell 3, so that an easy-to-handle fuel cell system can be achieved.

Figure 14:
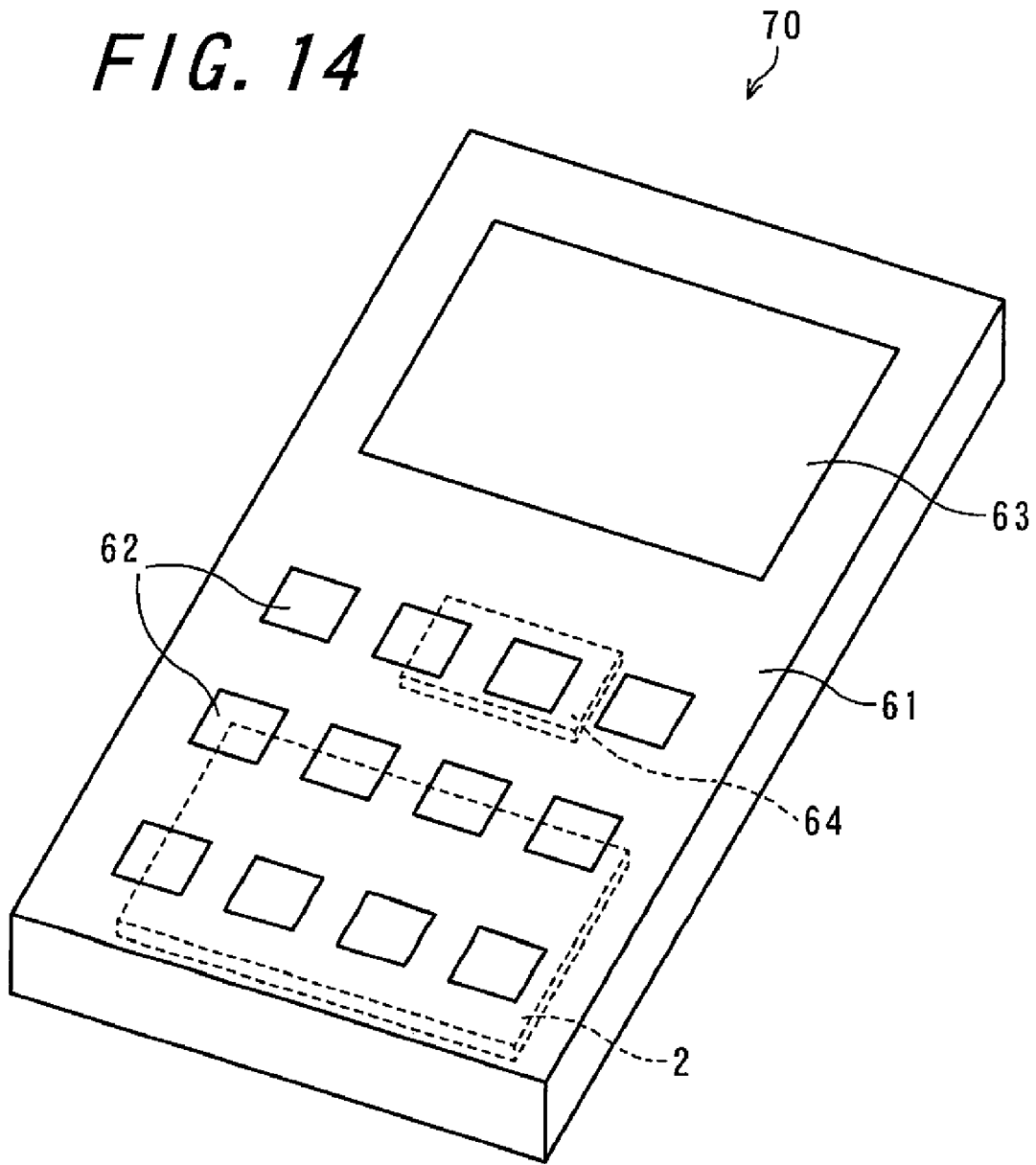
FIG. 14 is a perspective view showing an example of an electronic device on which the fuel cell system is mounted.
Figure 15:
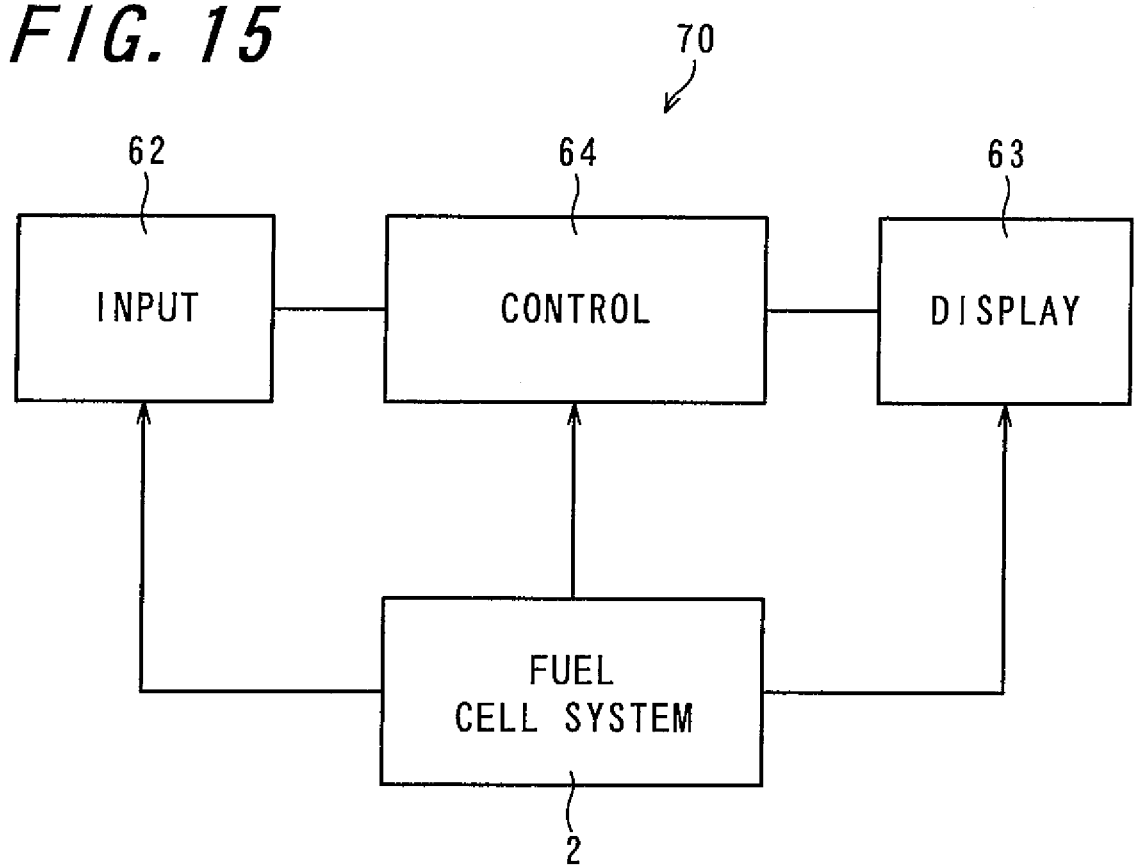
FIG. 15 is a block diagram illustrating an electrical configuration of the electronic device.

FIG. 14 is a perspective view showing an example of an electronic device 70 on which a fuel cell system 2 is mounted. FIG. 15 is a block diagram illustrating an electrical configuration of the electronic device 70. The electronic device 70 includes an operating portion 62 and a display portion 63 that are provided in a case 61, an operation control portion 64 that controls display content of the display portion 63 based on input information from the operating portion 62, and a fuel cell system 2 that is housed within the case 61 and supplies power to the operating portion 62, the display portion 63 and the operation control portion 64. Such an electronic device 70 can be, for example, an electronic calculator used in arithmetic calculation.

Furthermore, the electronic device on which the fuel cell system 2 is mounted is not limited to an electronic calculator as shown in FIGS. 14 and 15, and can be a digital camera, cell phone, device, notebook computer, watch, PDA, or other electronic devices. The configuration of the fuel cell system 2 excluding at least the raw material container 60 is provided inside the electronic device's case, and the raw material container 60 is detachably provided in a portion of the electronic device excluding the raw material container 60. The raw material container 60 may also be provided inside the electronic device's case. The raw material container 60 is configured, when attached to a portion of the electronic device excluding the raw material container 60, such that the raw material of the raw material container 60 can be supplied to the reaction apparatus 1 by a pump.

According to this embodiment, it is possible to generate and supply the power required by the operating portion 62, the display portion 63 and the operation control portion 64 using the fuel cell system 2. Consequently, an electronic device that is driven with power generated by the fuel cell system can be achieved.

Furthermore, the electronic device may not include the operating portion 62 and the display portion 63, and by mounting the fuel cell system 2, it is possible to achieve an electronic device that is driven by power generated by the fuel cell system.

It should be noted that the above-described embodiment is merely an example of the invention, and, thus, the configuration can be changed. For example, the reaction apparatus 1 may be used for a reaction other than a reaction that produces hydrogen.

Furthermore, in the above described embodiment, the reaction apparatus 1 is configured such that the product produced as a result of the reaction in the reforming reaction chamber 31, which is a high temperature reaction chamber of the reformer 4 that is a high temperature reaction portion, is guided to the removing reaction chamber 35, which is a low temperature reaction chamber of the CO remover 5 that is a low temperature reaction portion, so as to cause a reaction, but the reaction apparatus of the invention is not limited thereto, and the reaction apparatus 1 may be configured such that, for example, the product produced as a result of the reaction in the low temperature reaction chamber of the low temperature reaction portion is guided to the high temperature reaction chamber of the high temperature reaction portion so as to cause a reaction.

Further, in the above-described embodiment, the reformer lid member 15 and the remover lid member 16 are made of the same material, but the invention is not limited thereto, and the reformer lid member 15 and the remover lid member 16 may be made of different materials. In the case where the reformer lid member 15 and the remover lid member 16 are made of different materials, the coefficient of thermal expansion of the reformer connecting member 18 is a selected value between the coefficient of thermal expansion of the reformer lid member 15 and that of the reformer ceramic part 11. Likewise, the coefficient of thermal expansion of the remover connecting member 20 is a selected value between the coefficient of thermal expansion of the remover lid member 16 and that of the remover ceramic part 12.

Furthermore, in the above-described embodiment, the reformer connecting member 18 is interposed between the reformer lid member 15 and the reformer ceramic part 11, bur the invention is not limited thereto, and another connecting member or more may be interposed either or both of between the reformer lid member 15 and the reformer connecting member 18, and between the reformer connecting member 18 and the reformer ceramic part 11. Similarly, the remover connecting member 20 is interposed between the remover lid member 16 and the remover ceramic part 12, but the invention is not limited thereto, and another connecting member or more may be interposed either or both of between the remover lid member 16 and the remover connecting member 20, and between the remover connecting member 20 and the remover ceramic part 12.

Also, in the above-described embodiment, the reformer fins 25 are each connected to the reformer partition 26 by spot welding, but the invention is not limited thereto, and the fins may be connected by other methods, such as by adhesion with an adhesive or by bracing. Similarly, the remover fins 27 are each connected to the remover partition 28 by spot welding, but the invention is not limited thereto, and the fins may be connected by other methods, such as by adhesion with an adhesive or by brazing.

Further, in the above-described embodiment, the reformer fins 25 and the reformer partition 26 are configured with different members, but the invention is not limited thereto, and the reformer fins 25 and the reformer partition 26 may be configured as a single-piece structure. Similarly, the remover fins 27 and the remover partition 28 are configured with different members, but the invention is not limited thereto, and the remover fins 27 and the remover partition 28 may be configured as a single-piece structure.

Furthermore, in the above-described embodiment, the reformer lid member 15 is connected to the reformer ceramic part 11 with the reformer connecting member 18, but the invention is not limited thereto, and the reformer lid member 15 may be connected directly to the reformer ceramic part 11 without the reformer connecting member 18. Similarly, the remover lid member 16 is connected to the remover ceramic part 12 with the remover connecting member 20, but the invention is not limited thereto, and the remover lid member 16 may be connected directly to the remover ceramic part 12 without the remover connecting member 20.

The substrate's interior flow channel 50 may or may not meander. Also, the lengths of the reformer 4 and the CO remover 5 are not limited to these of the present embodiment. For example, the reformer 4 and the CO remover 5 may have different lengths in the second direction y, the area of the reformer 4 as viewed from above may be the same as the area of the CO remover 5 as viewed from above, or the area of the reformer 4 as viewed from above may be larger.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. A reaction apparatus comprising:
a first ceramic part including a reformer ceramic part, a CO-remover ceramic part and a connecting ceramic part connecting the reformer ceramic part and the CO-remover ceramic part; and
a plurality of first members connected to the first ceramic part by a connecting member disposed therebetween such that a reforming reaction chamber is arranged on the reformer ceramic part and a CO-removing reaction chamber is arranged on the CO-remover ceramic part, the first members having a thermal conductivity higher than that of the first ceramic part,
the connecting ceramic part having a cross-sectional area which is smaller than that of the reformer ceramic part and the CO-remover ceramic part.

2. The reaction apparatus of claim 1, wherein a coefficient of thermal expansion of the connecting member is between a coefficient of thermal expansion of the first members having a thermal conductivity higher than the first ceramic part and a coefficient of thermal expansion of the first ceramic part.

3. The reaction apparatus of claim 1, wherein a communicating path communicating between the reforming reaction chamber and the CO-removing reaction chamber is formed in the connecting ceramic part.

4. The reaction apparatus of claim 3, wherein flow channels are formed in the reforming reaction chamber and the CO-removing reaction chamber, and
at least one of the reforming reaction chamber and the CO-removing reaction chamber has a side wall that defines the flow channel and includes a second member having a thermal conductivity higher than the connecting ceramic part.

5. The reaction apparatus of claim 4, wherein the first ceramic part comprises a laminate of a plurality of ceramic layers.

6. The reaction apparatus of claim 4, further comprising a heat generating portion that heats at least one of the reforming reaction chamber and the CO-removing reaction chamber, and
wherein the heat generating portion has a combination of a partition and a substrate that is disposed so as to face the partition and has a thermal conductivity lower than the partition, and the partition is provided to the one of the reforming reaction chamber and the CO-removing reaction chamber.

7. The reaction apparatus of claim 4, wherein the side wall that is disposed in at least one of the reforming reaction chamber and the CO-removing reaction chamber and defines the flow channel has a plurality of fins.

8. The reaction apparatus of claim 1, wherein at least one of the reformer ceramic part and the CO-remover ceramic part has a peripheral region connected to the connecting ceramic part and a center region,
wherein the thickness of the peripheral region is smaller than the thickness of the center region.

9. The reaction apparatus of claim 1, wherein at least one of the reformer ceramic part and the CO-remover ceramic part has a second ceramic part including a peripheral region connected to the connecting ceramic part and a center region, and
wherein a cross-sectional area of the peripheral region in the thickness direction of the second ceramic part is smaller than a cross-sectional area of the center region in the thickness direction of the second ceramic part.

10. The reaction apparatus of claim 1, wherein the reformer ceramic part, the CO-remover ceramic part and the connecting ceramic part are formed as a continuous ceramic substrate, and
a distance between the reformer ceramic part and CO-remover ceramic part in a peripheral region of the connecting ceramic part is longer than a distance between the reformer ceramic part and the in a region other than the peripheral region of the connecting ceramic part.

11. The reaction apparatus of claim 8, wherein the connecting ceramic part has an incurved region connected to at least one of the reformer ceramic part and the CO-remover ceramic part.

12. The reaction apparatus of claim 1, wherein the reforming reaction chamber performs a reaction that produces hydrogen.

13. A fuel cell system comprising:
the reaction apparatus of claim 1; and
a fuel cell for generating power using a reaction product produced by the reaction apparatus as fuel.

14. An electronic device comprising the fuel cell system of claim 13.

15. An electronic device comprising:
an operating portion and a display portion disposed in a case;
an operation control portion for controlling display content of the display portion based on input information from the operating portion; and
the fuel cell system of claim 13 housed within the case, for supplying power to the operating portion, the display portion and the operation control portion.

* * * * *